(12) United States Patent
Park et al.

(10) Patent No.: US 12,126,901 B2
(45) Date of Patent: Oct. 22, 2024

(54) ELECTRONIC DEVICE AND METHOD FOR SUPPORTING DEBLURRING OF IMAGE DATA

(71) Applicant: SAMSUNG ELECTRONICS CO., LTD., Suwon-si (KR)

(72) Inventors: Minkyu Park, Suwon-si (KR); Sungjun Yim, Suwon-si (KR); Dongo Kim, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 130 days.

(21) Appl. No.: 17/882,253

(22) Filed: Aug. 5, 2022

(65) Prior Publication Data

US 2023/0040122 A1 Feb. 9, 2023

Related U.S. Application Data

(63) Continuation of application No. PCT/KR2022/011581, filed on Aug. 4, 2022.

(30) Foreign Application Priority Data

Aug. 5, 2021 (KR) .................. 10-2021-0103312

(51) Int. Cl.
*H04N 23/68* (2023.01)
*H04N 23/53* (2023.01)
(52) U.S. Cl.
CPC .......... *H04N 23/683* (2023.01); *H04N 23/53* (2023.01)
(58) Field of Classification Search
CPC ..... H04N 23/683; H04N 23/53; H04N 23/617

USPC ........................................... 348/471
See application file for complete search history.

(56) References Cited

U.S. PATENT DOCUMENTS

| 2008/0118171 | A1* | 5/2008 | Iwabuchi | H04N 23/68 |
| | | | | 348/E5.046 |
| 2009/0067742 | A1* | 3/2009 | Lim | G06T 5/73 |
| | | | | 382/263 |
| 2010/0188558 | A1* | 7/2010 | Gamadia | H04N 23/673 |
| | | | | 348/E5.045 |

(Continued)

FOREIGN PATENT DOCUMENTS

| CN | 107646194 A | 1/2018 |
| CN | 109360171 A | 2/2019 |

(Continued)

OTHER PUBLICATIONS

International Search Report with Written Opinion issued in International Application No. PCT/KR2022/011581; International Filing Date Aug. 4, 2022; Date of Mailing Nov. 16, 2022 (10 pages).

*Primary Examiner* — John W Miller
*Assistant Examiner* — Sean N. Haiem
(74) *Attorney, Agent, or Firm* — CANTOR COLBURN LLP

(57) ABSTRACT

An electronic device having a camera module for generating image data, a processor for receiving the image data and generating image data restored based on the image data. The electronic device also having a display module displaying the restored image data. The processor being configured to identify a class of the image data, select a filter corresponding to the class, and generate the restored image data by applying the selected filter to the image data.

16 Claims, 19 Drawing Sheets

(56) References Cited

U.S. PATENT DOCUMENTS

| | | | |
|---|---|---|---|
| 2010/0201865 A1* | 8/2010 | Han | H04N 23/80 348/222.1 |
| 2012/0155785 A1* | 6/2012 | Banner | G06T 5/73 382/264 |
| 2013/0088489 A1* | 4/2013 | Schmeitz | G06T 5/20 345/419 |
| 2016/0098819 A1* | 4/2016 | Sugimoto | H04N 23/661 382/260 |
| 2018/0160142 A1* | 6/2018 | Zhao | H04N 19/139 |
| 2018/0365812 A1* | 12/2018 | Hayashi | H04N 1/409 |
| 2019/0387175 A1* | 12/2019 | Kikuchi | H04N 23/80 |
| 2022/0157044 A1* | 5/2022 | Schick | G01S 7/4802 |

FOREIGN PATENT DOCUMENTS

| | | |
|---|---|---|
| CN | 111091503 A | 5/2020 |
| JP | 2008058804 A | 3/2008 |
| JP | 2008211679 A | 9/2008 |
| JP | 2013025473 A | 2/2013 |
| JP | 2019215489 A | 12/2019 |
| KR | 20090027493 A | 3/2009 |
| KR | 102212964 B1 | 2/2021 |

\* cited by examiner

ELECTRONIC DEVICE AND METHOD FOR SUPPORTING DEBLURRING OF IMAGE DATA

CROSS REFERENCE TO RELATED APPLICATIONS

This application is a PCT-Bypass Continuation of International Patent Application No. PCT/KR2022/011581, filed on Aug. 4, 2022, which claims priority to Korean Patent Application No. 10-2021-0103312, filed on Aug. 5, 2021, and all the benefits accruing therefrom under 35 U.S.C. § 119, the contents of which are hereby incorporated by reference for all purposes as if fully set forth herein.

TECHNICAL FIELD

The disclosure relates to an electronic device and, more specifically, to an electronic device and method for supporting the deblurring of image data.

BACKGROUND ART

Electronic devices may obtain image data using a camera module. The image data obtained by the camera module may include a blur for various reasons. Blurring may degrade the quality of image data and may sometimes disable image data. Some reasons for blurring may include conditions when image data is captured. For example, unclear focusing, sudden motion of the subject to be captured, and a hand shake off the calibration range may cause blurring in the image data. Blurring that occurs due to conditions when image data is captured may be overcome by recapturing image data. Other reasons for blurring may come from the physical characteristics of the electronic device or camera module. Blurring due to the physical characteristics of the electronic device or camera module may be created any time image data is captured. Blurring caused by the physical characteristics of the electronic device or camera module cannot be addressed even by recapturing image data.

DISCLOSURE

Technical Problem

The disclosure aims to provide an electronic device and method for supporting deblurring at high speed to remove blurring caused by the physical characteristics of the electronic device or camera module.

Technical Solution

According to an embodiment of the disclosure, an electronic device includes a camera module configured to generate image data, a processor configured to receive the image data and generate image data restored based on the image data, and a display module for displaying the restored image data. The processor is further configured to identify a class of the image data, select a filter corresponding to the class, and generate the restored image data by applying the selected filter to the image data.

According to an embodiment of the disclosure, an electronic device includes a storage device for storing image data and degraded image data, a processor configured to receive the image data and the degraded image data, identify classes in the degraded image data, and select filters respectively corresponding to the classes restoring the degraded image data into the image data, and a memory for storing a lookup table including association information between the classes and the selected filters.

According to an embodiment of the disclosure, a method for deblurring image data includes receiving original image data and first degraded image data; identifying classes from the first degraded image data; identifying filters respectively corresponding to the classes to restore the first degraded image data to be close to the original image data; receiving second degraded image data; identifying the classes from the second degraded image data; and generating restored image data by applying the filters respectively corresponding to the classes to the second degraded image data.

Advantageous Effects

According to the disclosure, classes of image data are identified in real-time, and deblurring is performed using filters corresponding to the classes. Accordingly, there is provided an electronic device and method for deblurring in real-time to remove blurring due to the physical characteristics of the electronic device or camera module.

DETAILED DESCRIPTION

Hereinafter, embodiments of the disclosure are described in such a detailed and clear manner that one of ordinary skill in the art of the disclosure may easily implement the disclosure.

Figure 1:
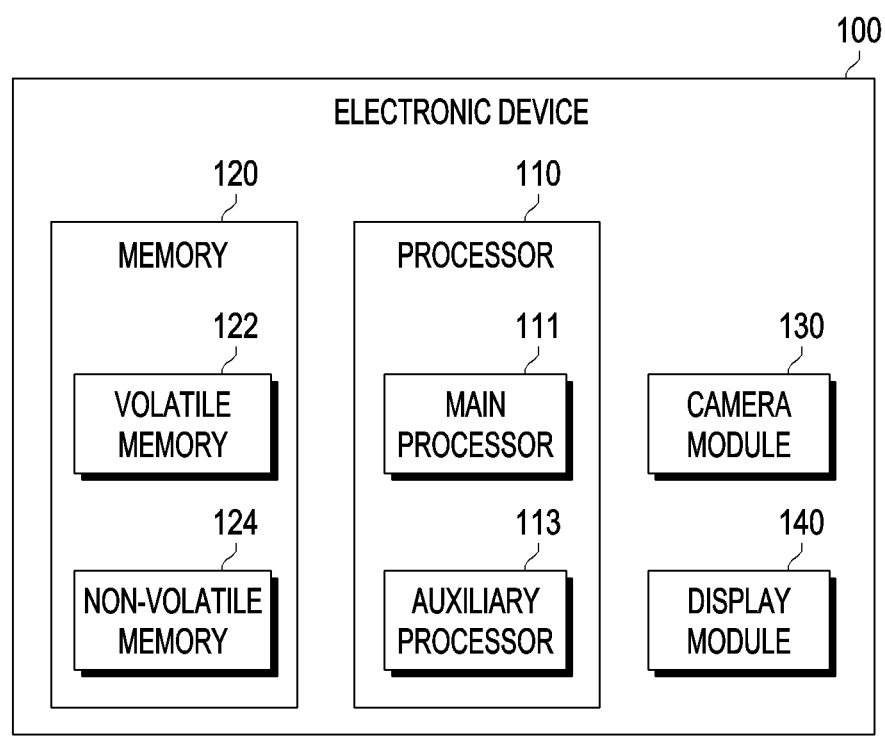
FIG. 1 illustrates an electronic device according to a first embodiment of the disclosure.

FIG. 1 illustrates an electronic device 100 according to a first embodiment of the disclosure. Referring to FIG. 1, an electronic device 100 includes a processor 110, a memory 120, a camera module 130, and a display module 140. The processor 110 may execute an operating system, middleware, or applications of the electronic device 100. The processor 110 may include a main processor 111 and an auxiliary processor 113. The main processor 111 may include a central processing unit (CPU) or an application processor (AP).

The auxiliary processor 113 may include a graphics processor (GPU), a neural processor (NPU), a neuromorphic processor, an image signal processor (ISP), a digital signal processor (DSP), a sensor hub processor, or a communication processor. The auxiliary processor 113 may instead process some of tasks of the main processor 111 at the request of the main processor 111.

The memory 120 may be used to store data. The memory 120 may include a volatile memory 122 and a non-volatile memory 124. The volatile memory 122 may include various memories, such as a static random access memory, dynamic random access memory, phase-change random access memory, ferroelectric random access memory, magnetic random access memory, or resistive random access memory. The volatile memory 122 may be used as a main memory of the electronic device 100. For example, the volatile memory 122 may temporarily store codes executed by the operating system, middleware, or applications. The volatile memory 122 may temporarily store data generated by the operating system, middleware, or applications. The non-volatile memory 124 may include various non-volatile memories, such as a NAND flash memory, a phase-change memory, a ferroelectric memory, a magnetic memory, or a resistive memory. The non-volatile memory 124 may be used as an auxiliary memory of the electronic device 100. For example, the non-volatile memory may store the original codes executed by the operating system, middleware, or applications. The non-volatile memory may store original data generated by the operating system, middleware, or applications.

The camera module 130 may capture a still image or moving images. The camera module 130 may include at least one lens and may generate image data corresponding to a predetermined resolution, based on the light incident through at least one lens. The image data may be stored in the memory 120 through the processor 110.

The display module 140 may receive image data from the memory 120 through the processor 110. The display module 140 may display the received image data. For example, the display module 140 may be implemented in combination with an input means, such as a touch pad.

For example, the electronic device 100 may be implemented as a mobile device, such as a smartphone, smartwatch or a smart pad. Hereinafter, the technical spirit of the disclosure is described with reference to examples in which the electronic device 100 is implemented as a smartphone, but the disclosure is not limited as applied to smartphones.

Figure 2A:
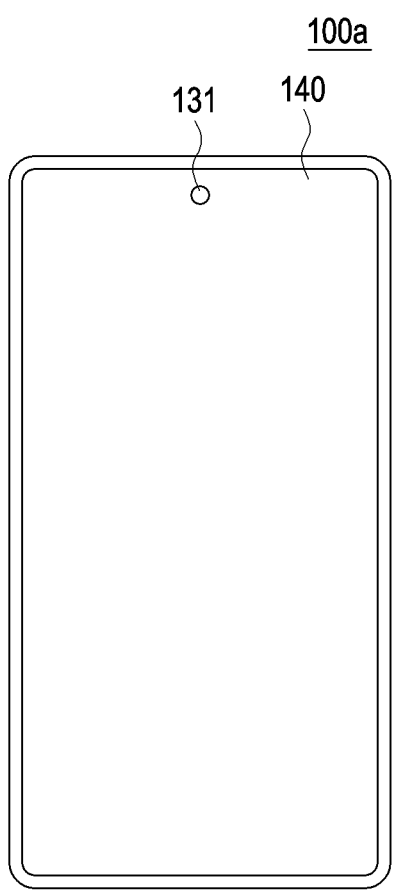
FIGS. 2A, 2B, 2C, 2D, and 2E illustrate examples in which an electronic device of the disclosure is implemented as a smartphone according to the first embodiment.
Figure 2B:
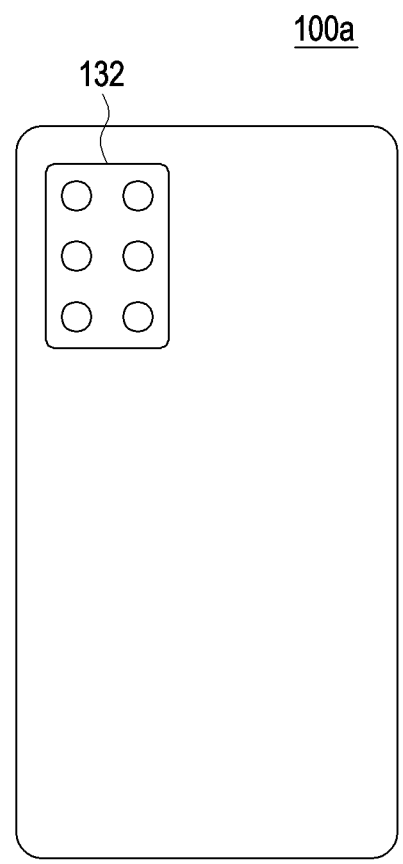
Figure 2C:
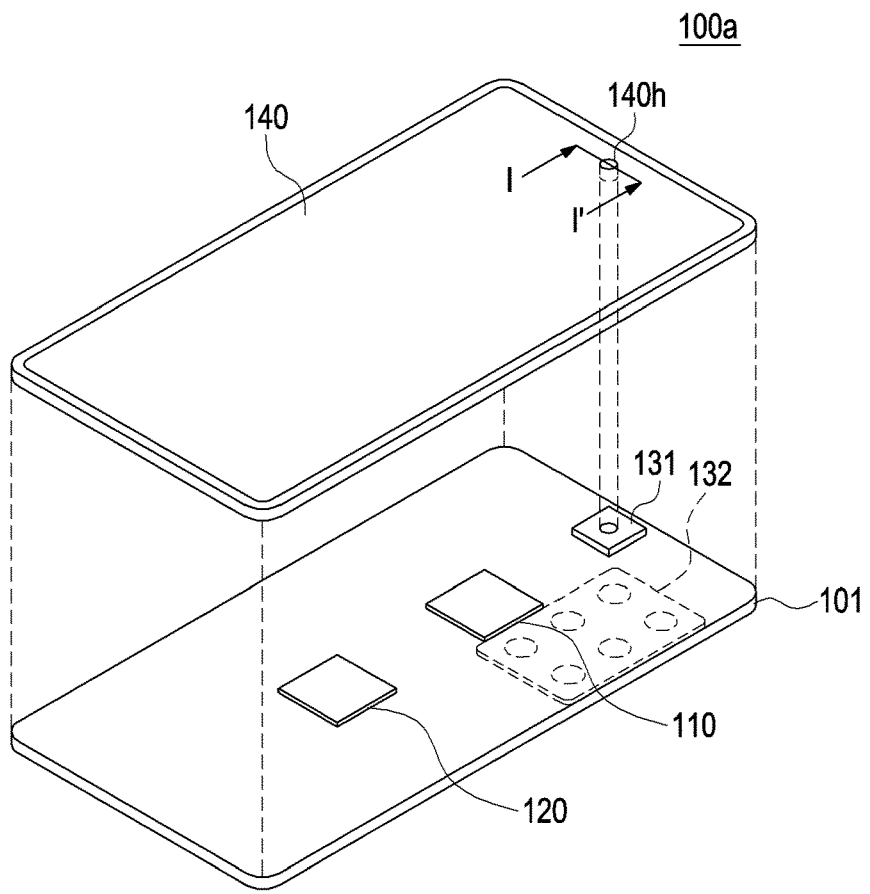
Figure 2D:
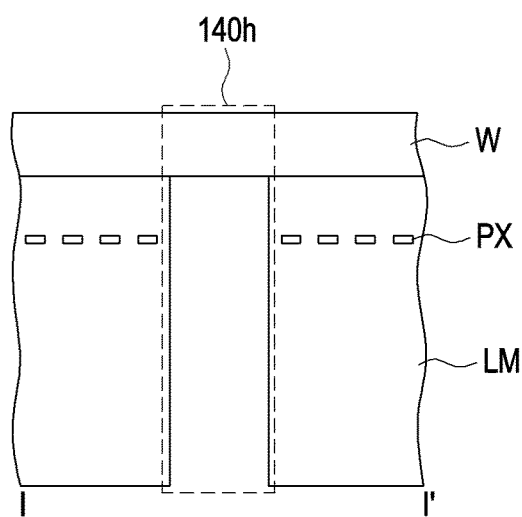
Figure 2E:
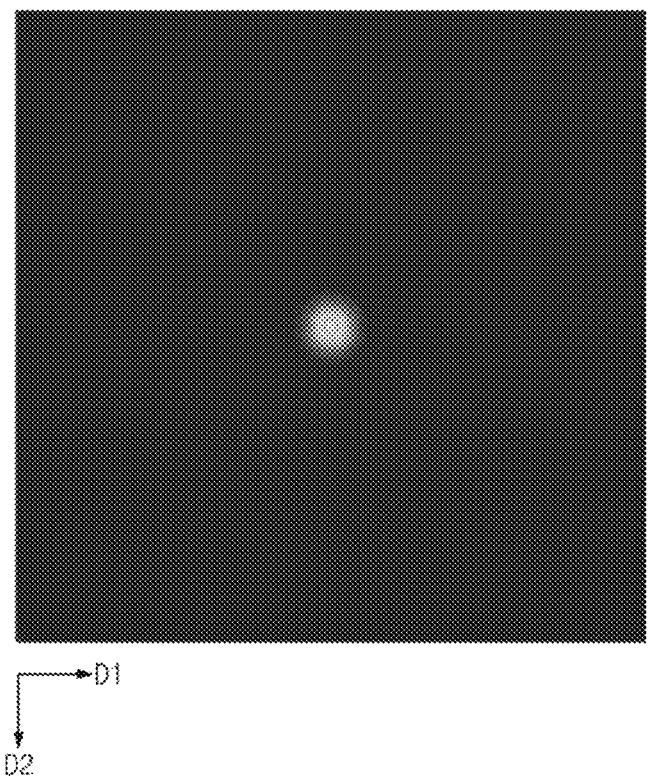

FIGS. 2A, 2B, 2C, 2D, and 2E illustrate examples in which an electronic device 100 of the disclosure is implemented as a smartphone 100a according to the first embodiment. FIG. 2A illustrates a front surface of the smartphone 100a, and FIG. 2B illustrates a rear surface of the smartphone 100a. FIG. 2C is an exploded perspective view of the smartphone 100a. FIG. 2D is an example cross-sectional view taken along line I-I' of FIG. 2E. FIG. 2E illustrates the physical characteristics applied when the smartphone 100a captures image data.

Referring to FIGS. 1 and 2A, a display module 140, corresponding to the display module 140 of the electronic device 100, may be provided on the front surface of the smartphone 100a. A first camera module 131, corresponding to at least a portion of the camera module 130 of the electronic device 100 of FIG. 1, may be provided to penetrate at least a portion of the display module 140.

Referring to FIGS. 1 and 2B, a second camera module 132, corresponding to at least a remaining portion of the camera module 130 of the electronic device 100, may be provided on the rear surface of the smartphone 100a. For example, the second camera module 132 may be implemented to include various components, such as a wide camera, an ultra-wide camera, a telescopic camera, a distance measuring camera, an infrared camera, or a flashlight.

Referring to FIGS. 1 and 2C, the processor 110, the memory 120, and the first camera module 131 may be provided between the display module 140 and the rear cover 101 of the smartphone 100a. The second camera module 132 may be hidden, but is shown in dashed lines for reference. The display module 140 of the second portion 102 may have a hole 140h. The position of the hole 140h may correspond to the position of the lens of the first camera module 131.

Referring to FIGS. 1, 2C, and 2D, the display module 140 may include a window W and a lower member LM. The lower member LM may include an anti-reflection film, a touch sensor, a display panel, a functional member, and the like. For example, pixels PX of the display panel are illustrated in FIG. 2D. The hole 140h may be an empty space passing through the lower member LM. For example, the hole 140h may be aligned with the lens of the first camera module 131.

FIG. 2E illustrates an example of a point spread function (PSF) of the first camera module 131. The point spread function may denote data representing the degree of how much one point is spread when a point is captured using the first camera module 131. The point spread function may be based on the physical characteristics of the camera module 131.

For example, the point spread function may be determined based on various physical characteristics, such as the type and characteristics of the material filling the hole 140h, the type and characteristics of the lens of the first camera module 131, the structure of the lens of the first camera module 131, or the type and characteristics of the image sensor of the first camera module 131.

As shown in FIG. 2E, when capturing a point using the first camera module 131, circular image data surrounding the point may be obtained. The point spread function may cause blurring in the image data generated using the first camera module 131. Since the point spread function is based on the physical characteristics of the first camera module 131, blurring due to the point spread function may be caused any time in the image data.

Point spread function-induced blurring may also occur likewise in the second camera module 132, as well as the first camera module 131. In other words, blurring may also occur any time in the image data generated using the second camera module 132.

Figure 3A:
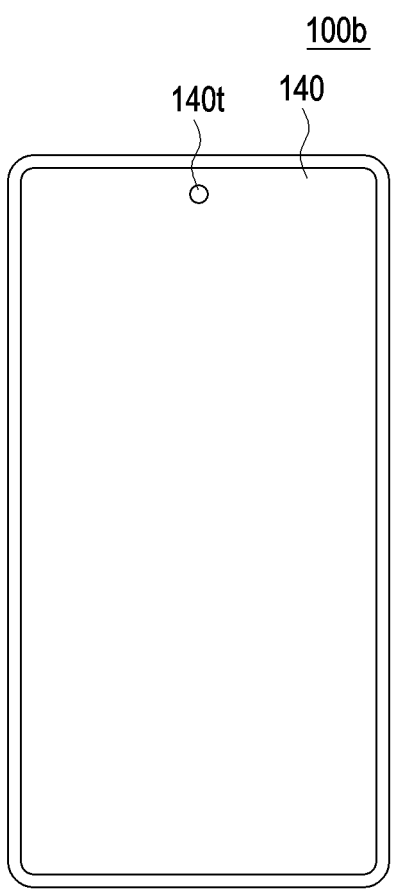
FIGS. 3A, 3B, 3C, 3D, and 3E illustrate examples in which an electronic device of the disclosure is implemented as a smartphone according to a second embodiment.
Figure 3B:
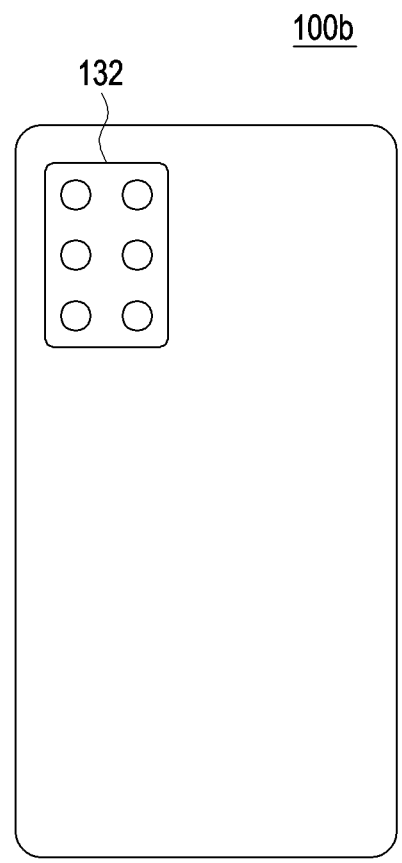

Referring to FIGS. 1 and 3A, a display module 140, corresponding to the display module 140 of the electronic device 100, may be provided on the front surface of the smartphone 100*b*. The display module 140 may include a light transmission area 140*t*. The light transmission area 140*t* may transmit light incident from the outside. Referring to FIGS. 1 and 3B, a second camera module 132, corresponding to at least a remaining portion of the camera module 130 of the electronic device 100, may be provided on the rear surface of the smartphone 100*b*. For example, the second camera module 132 may be implemented to include various components, such as a wide camera, an ultra-wide camera, a telescopic camera, a distance measuring camera, an infrared camera, or a flashlight.

Figure 3C:
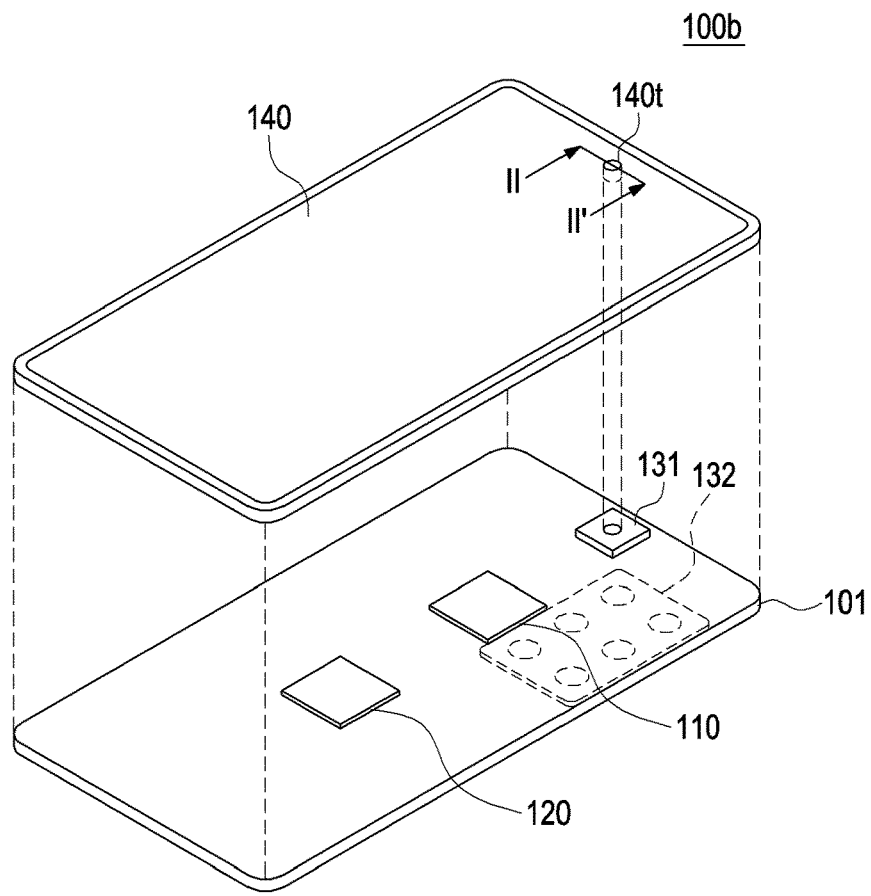

Referring to FIGS. 1 and 3C, the processor 110, the memory 120, and the first camera module 131 may be provided between the display module 140 and the rear cover 101 of the smartphone 100*b*. The second camera module 132 may be hidden, but is shown in dashed lines for reference. The position of the light transmission area 140*t* may correspond to the position of the lens of the first camera module 131. For example, the first camera module 131 may be implemented as an under display camera (UDC).

Figure 3D:
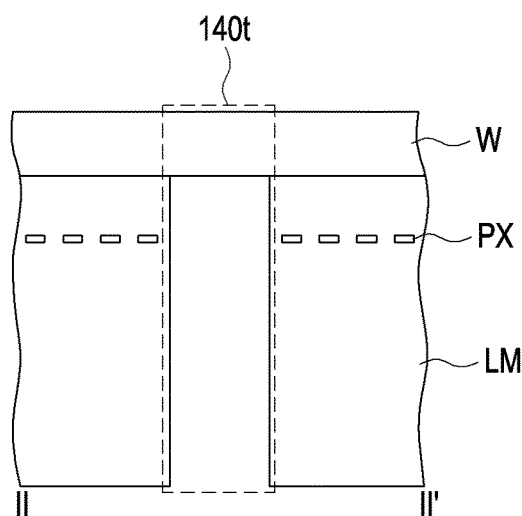

Referring to FIGS. 1, 3C, and 3D, the display module 140 may include a window W and a lower member LM. The lower member LM may include an anti-reflection film, a touch sensor, a display panel, a functional member, and the like. For example, pixels PX of the display panel are illustrated in FIG. 3D. The number or density of the pixels PX arranged in the light transmission area 140*t* may be smaller than the number or density of the pixels PX arranged in an area other than the light transmission area 140*t*. Light may be transferred to the first camera module 131 through an area in which the pixels PX are not disposed within the light transmission area 140*t*. A bottom metal layer (BML) for blocking light may be disposed under the pixels PX of the light transmission area 140*t*. The BML blocks light transmission by the transistors, preventing a malfunction of the transistors. The BML may be the cause of light diffraction.

Figure 3E:
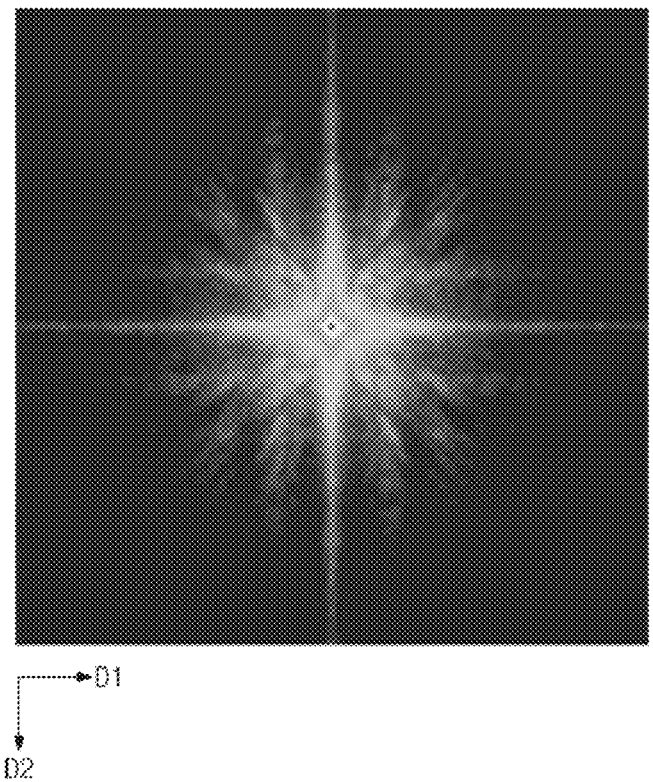

FIG. 3E illustrates an example of a point spread function (PSF) of the first camera module 131. The point spread function may denote data representing the degree of how much one point is spread when a point is captured using the first camera module 131. The point spread function may be based on the physical characteristics of the first camera module 131.

For example, the point spread function may be determined based on various physical characteristics, such as the type and characteristics of the material disposed in the light transmission area 140*t*, the type and characteristics of the lens of the first camera module 131, the structure of the lens of the first camera module 131, or the type and characteristics of the image sensor of the first camera module 131.

As shown in FIG. 3E, when a point is captured using the first camera module 131, such a shape of image data may be obtained as to protrude in a first direction (e.g., a horizontal direction) and a second direction (e.g., a vertical direction) from the point and scatter between the first direction and the second direction. The point spread function may cause blurring in the image data generated using the first camera module 131. Since the point spread function is based on the physical characteristics of the first camera module 131, blurring due to the point spread function may be caused any time in the image data.

As compared with the point spread function of FIG. 2E, the point spread function of FIG. 3E may have a shape of protruding along the first direction D1 and the second direction D2 perpendicular to the first direction. Unlike the hole 140*h* of the display module 140 of FIG. 2D, which is mostly implemented as an empty space, the light transmission area 140*t* of the display module 140 of FIG. 3D may include pixels and may include a BML associated with the pixels. The light transmitted through the light transmission area 140*t* may be diffracted while passing between the components of the light transmission area 140*t* of the display module 140, such as pixels, and the BML. Accordingly, the point spread function of the first camera module 131 implemented as a UDC may occupy a larger range than that of the point spread function of the first camera module 131 implemented as a non-UDC. The image data generated by the first camera module 131 implemented as a UDC may frequently have a larger blur than the image data generated by the first camera module 131 implemented as a non-UDC.

To remove point spread function-induced blurring, i.e., to perform deblurring, deep learning may be used. For example, a deblurring module for removing point spread function-induced blurring may be trained based on deep learning. The processor 110 of FIG. 1 may remove point spread function blurring by applying the deblurring module to the image data generated by the camera module 130.

However, the deep learning-based deblurring module disadvantageously has low operation speed. The deblurring module may perform a plurality of convolution computations and resizing computation and thus may not perform real-time deblurring. The deblurring module may delay the time when the electronic device 100 generates image data and, in particular, cause large latency when the electronic device 100 generates video.

The disclosure provides a device or method for removing (or restoring) point spread function-induced blurring with a similar quality to that of a deep learning-based deblurring module while allowing for high-speed, real-time processing.

Figure 4:
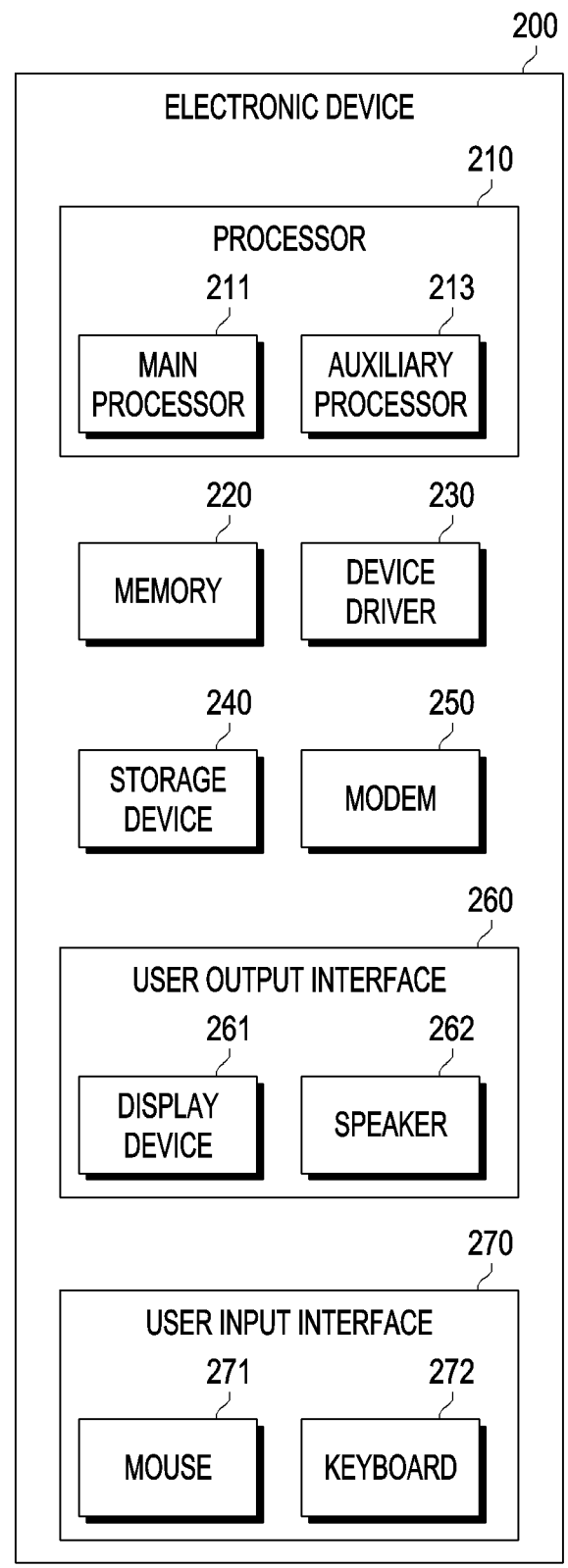
FIG. 4 is a block diagram illustrating an electronic device performing filter training according to an embodiment of the disclosure.

FIG. 4 is a block diagram illustrating an electronic device 200 for performing filter training according to an embodiment of the disclosure. An electronic device 200 may perform filter learning to search for deblurring filters appropriate for the type of image data. For example, the electronic device 200 may include a high-performance stationary device, such as a computer or a workstation.

Referring to FIG. 4, the electronic device 200 may include a processor 210, a memory 220, a device driver 230, a storage device 240, a modem 250, a user output interface 260, and a user input interface 270.

The processor 210 may execute an operating system, middleware, or applications of the electronic device 200. The processor 210 may include a main processor 211 and an auxiliary processor 213. The main processor 211 may include a central processing unit (CPU) or an application processor (AP).

The auxiliary processor 213 may include a graphics processor (GPU), a neural processor (NPU), a neuromorphic processor, an image signal processor (ISP), a digital signal processor (DSP), a sensor hub processor, or a communication processor. The auxiliary processor 213 may instead process some of tasks of the main processor 211 at the request of the main processor 211.

The memory 220 may be used as an operating memory of the processor 210, and it may be used as a main memory or system memory of the electronic device 200. The memory 220 may include a volatile memory, such as a static random access memory or dynamic random access memory, or a non-volatile memory, such as a phase-change random access memory, ferroelectric random access memory, magnetic random access memory, or resistive random access memory.

The device driver 230 may control peripheral devices, such as the storage device 240, the modem 250, the user output interface 260, and the user input interface 270 according to the request of the processor 210. The storage device 240 may include a fixed storage device, such as a hard disk drive or a solid state drive, or a removable storage device, such as an external hard disk drive, an external solid state drive, or a removable memory card.

The modem 250 may provide remote communication with an external device. The modem 250 may perform wireless or wired communication with an external device. The modem 250 may communicate with an external device through at least one of various communication types, such as ethernet, Wi-Fi, LTE, 5G mobile communication, and the like.

The user output interface 260 may include devices that provide information to the user, such as a display device 261 and a speaker 262. The user input interface 270 may include devices that receive information from the user, such as a mouse 271, a keyboard 272, and the like.

Figure 5:
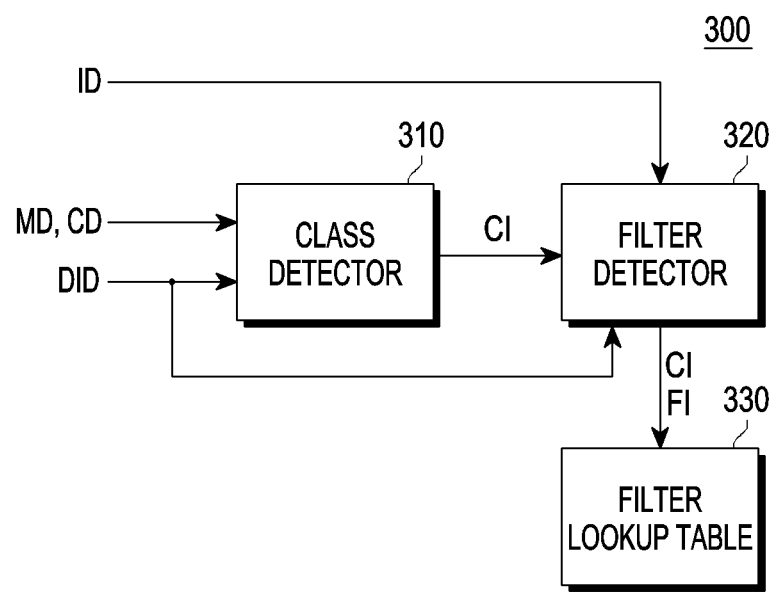
FIG. 5 illustrates an example of a learning module executed by a processor of the electronic device of FIG. 4.

FIG. 5 illustrates an example of a learning module 300 executed by a processor 210 of the electronic device 200 of FIG. 4. For example, the learning module 300 may perform filter training to search for filters suitable for features of image data.

Referring to FIGS. 4 and 5, the learning module 300 may receive image data ID, degraded image data DID, metadata MD, and capture data CD. The image data ID may be data with point spread function-induced blurring removed. For example, the image data ID may be obtained by applying a deconvolution filter (or a deblurring module) to the image data captured by the smartphone 100a of FIGS. 2A, 2B, and 2C.

The degraded image data DID may be generated by degrading the image data ID. For example, the electronic device 200 may receive image data ID and may then degrade the image data ID to thereby generate degraded image data DID. The electronic device 200 may generate the degraded image data DID by applying (e.g., convolution operation) the point spread function of FIG. 2E or the point spread function of FIG. 3E to the image data ID. Or, raw image data obtained using the camera module 130, e.g., image data for which the influence by the point spread function has not been corrected may be used as the degraded image data DID.

The metadata MD may include information about the image data ID or the degraded image data DID. The metadata MD may include at least one of whether a face has been recognized from the image data ID or degraded image data DID, brightness information about the image data ID or degraded image data DID, noise information about the image data ID or degraded image data DID, and whether the image data ID or degraded image data DID contains haze, mist or fog. For example, the metadata MD may be generated along with the image data ID by the camera module.

The capture data CD may include state information when the image data ID is captured. For example, the capture data CD may include at least one of size information about the image data ID, scene classification information about the image data ID, edge direction information about the image data ID, auto-focus (AF) information when the image data ID is captured, auto white balance (AWE) information when the image data ID is captured, and auto exposure (AE) information when the image data ID is captured. For example, the scene classification information may include information, such as distant view, near view, person, night, daytime, indoor, or outdoor.

The image data ID, degraded image data DID, metadata MD, and capture data CD may be stored in the storage device 240 and be transferred to the processor 210 (e.g., the learning module 300 executed by the processor 210).

The processor 210 (e.g., the learning module 300 executed by the processor 210) may identify one or more classes of image data based on the image data ID, degraded image data DID, metadata MD, and capture data CD and select (or detect or learn) filters respectively corresponding to the classes. The learning module 300 may include a class detector 310, a filter detector 320, and a filter lookup table 330.

The class detector 310 may receive the degraded image data DID, metadata MD, and capture data CD. The class detector 310 may identify the class of the degraded image data DID based on at least one of the degraded image data DID, metadata MD, and capture data CD. The class detector 310 may identify the class of the degraded image data DID in real-time and transfer the identified class information CI to the filter detector 320.

As an example, the class detector 310 may identify the class based on values of the information included in the metadata MD or capture data CD. The class detector 310 may identify the class of the degraded image data DID depending on what range the values of the information included in the metadata MD or capture data CD belong to.

As another example, the class detector 310 may identify the class of the degraded image data DID using a module trained based on deep learning. The class detector 310 may input the degraded image data DID, metadata MD, or capture data CD to the deep learning-based module. The deep learning-based module may output class information CI.

The filter detector 320 may receive the image data ID, degraded image data DID, and class information CI. The filter detector 320 may include a plurality of filters or information about the plurality of filters. The filter detector 320 may detect (or learn) a filter that restores the degraded image data DID to be closest to the image data ID. The filter detector 320 may output the class information CI and filter information FI to the filter lookup table 330.

The filter lookup table 330 may store the class information CI and the filter information FI corresponding to the class information CI, in association with each other. For example, the filter lookup table 330 may be stored in the memory 220 or the storage device 240 and may communicate with an external device through the modem 250.

Figure 6:
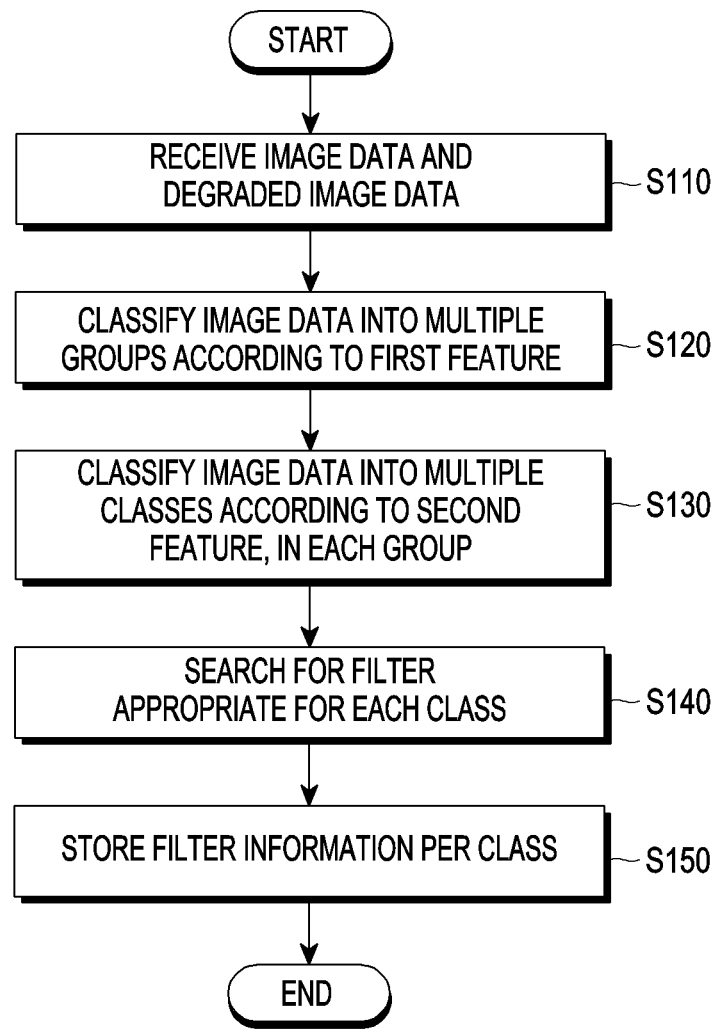
FIG. 6 illustrates an example of a process of generating a lookup table by a learning module.

FIG. 6 illustrates an example of a process of generating a lookup table 330 by a learning module 300. Referring to FIGS. 5 and 6, in step S110, the learning module 300 may receive the image data ID and the degraded image data DID. For example, the learning module 300 may further receive the metadata MD including information about the image data ID or degraded image data DID or the capture data CD including capture information.

In step S120, the class detector 310 of the learning module 300 may classify the image data ID into a plurality of groups according to a first feature. The first feature may be selected from among the metadata MD or capture data CD or may be generated from the metadata MD or capture data CD.

In step S130, the class detector 310 may classify the image data ID into a plurality of classes according to a second feature in each group. The second feature may be selected from among the metadata MD or capture data CD or may be generated from the metadata MD or capture data CD.

In step S140, the filter detector 320 may search for a filter appropriate for each class. In step S150, the filter detector 320 may store per-class filter information in the filter lookup table 330.

As an example, the classes may correspond to different contents. For example, when the image data includes different contents, such as face, indoor, outdoor, daytime, nighttime, city center, or nature, and aspects of blurring caused by the point spread function in the different contents may differ. As the aspects of blurring differ, the types of filters appropriate for deblurring may differ as well. The filter detector 320 of the disclosure may adaptively suppress (or restore) blurring of image data by searching for an appropriate filter per class. Accordingly, it is possible to perform deblurring with the performance close to the deep learning-based deblurring module.

Figure 7:
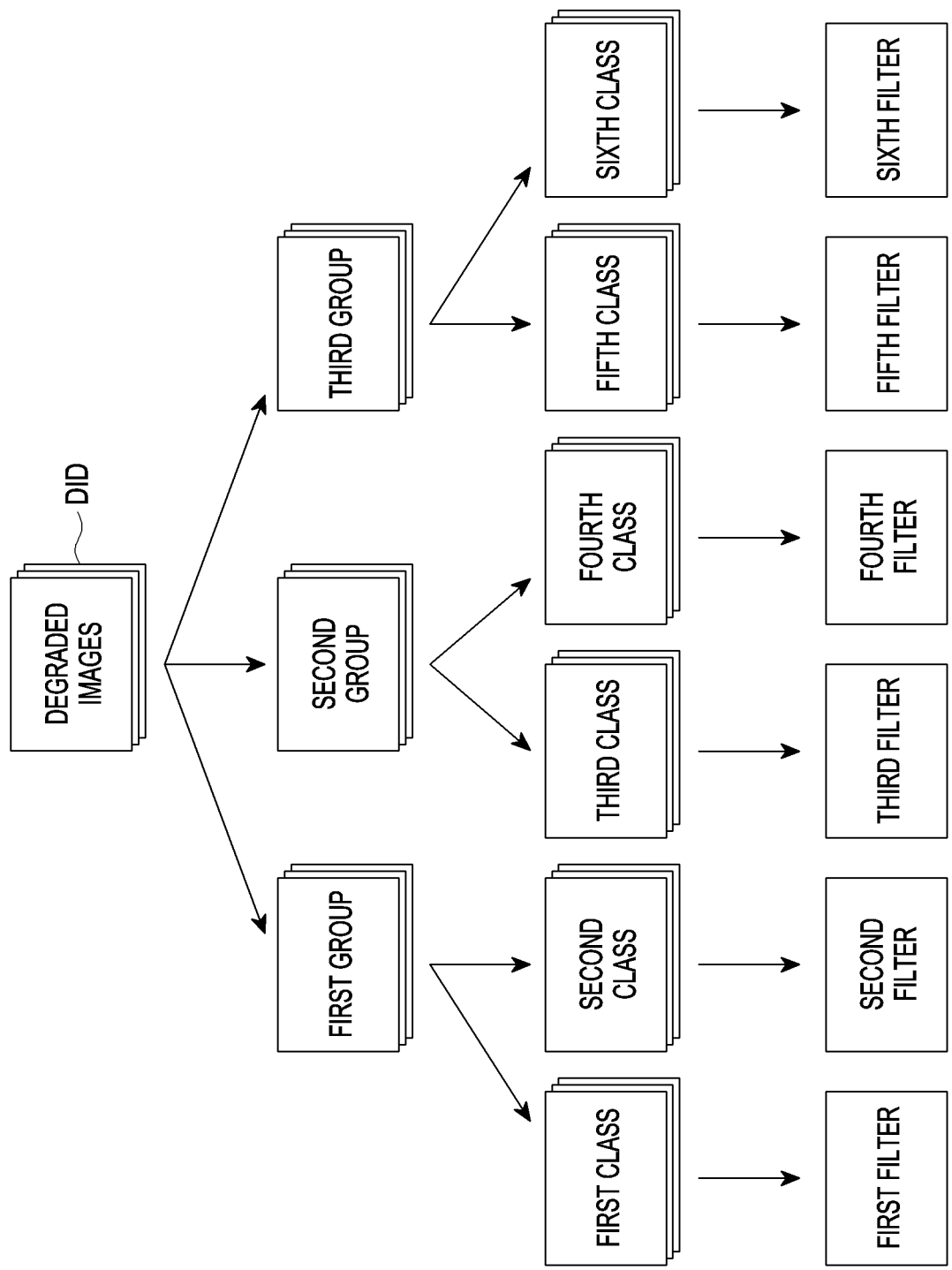
FIG. 7 illustrates an example in which a class of a degraded image data is identified and a filter is selected according to the method of FIG. 6.

FIG. 7 illustrates an example in which a class of a degraded image data DID is identified and a filter is selected according to the method of FIG. 6. Referring to FIGS. 5, 6, and 7, degraded image data DID may be classified into a first group, a second group, and a third group according to the first feature. The first group may be identified as belonging to a first class and a second class according to the second feature. The second group may be identified as belonging to a third class and a fourth class according to the second feature. The third group may be identified as belonging to a fifth class and a sixth class according to the second feature.

As an example, the first feature may be selected as the type of content of the degraded image data DID, e.g., scene classification information, from among the metadata MD and capture data CD. The degraded image data DID belonging to different contents, such as face, indoor, outdoor, daytime, nighttime, city center, or nature, may be identified as belonging to different groups. For example, the first feature may be selected as specific scene classification information, such as face, from among scene classification information.

The second feature may be selected from among the remaining information of the metadata MD or capture data CD. For example, the second feature may be selected from among size information about the degraded image data DID or the subject included in the degraded image data DID, brightness level information about the degraded image data DID, noise level information about the degraded image data DID, information indicating whether the degraded image data DID includes haze, mist, or fog, edge information about the degraded image data DID, auto-focus information when the degraded image data DID is captured, auto white balance information when the degraded image data DID is captured, or auto exposure information when the degraded image data DID is captured. For example, the second feature may be selected as the remaining scene classification information not selected as the first feature from among the scene classification information.

As another example, the first feature may be selected as one of size information about the degraded image data DID or the subject included in the degraded image data DID, brightness level information about the degraded image data DID, noise level information about the degraded image data DID, information indicating whether the degraded image data DID includes haze, mist, or fog, edge information about the degraded image data DID, auto-focus information when the degraded image data DID is captured, auto white balance information when the degraded image data DID is captured, or auto exposure information when the degraded image data DID is captured. The second feature may be selected from among the remaining information of the metadata MD or capture data CD, not selected as the first feature.

The first to sixth filters may be selected for the first to sixth classes, respectively. Among the first to sixth filters, some filters may differ. For example, if the class of the degraded image data DID is varied, the type of the filter may be varied. Among the first to sixth filters, other filters may be identical. For example, although the class of the degraded image data DID is varied, the type of the filter may not be varied. Even when the same type of filters are used in different classes, the filtering coefficients applied to the different classes may differ. As an example, each of the first to sixth filters may be selected from among various filters in a filter pool including deconvolution filters, weiner filters, or city light suppression (CLS) filters.

For example, image data including a face may be managed separately from other image data. Although the scene classification information is not used as the first feature or second feature, the image data including a face may be managed as one group or class. In other words, the image data including a face may be assigned priority.

Figure 8:
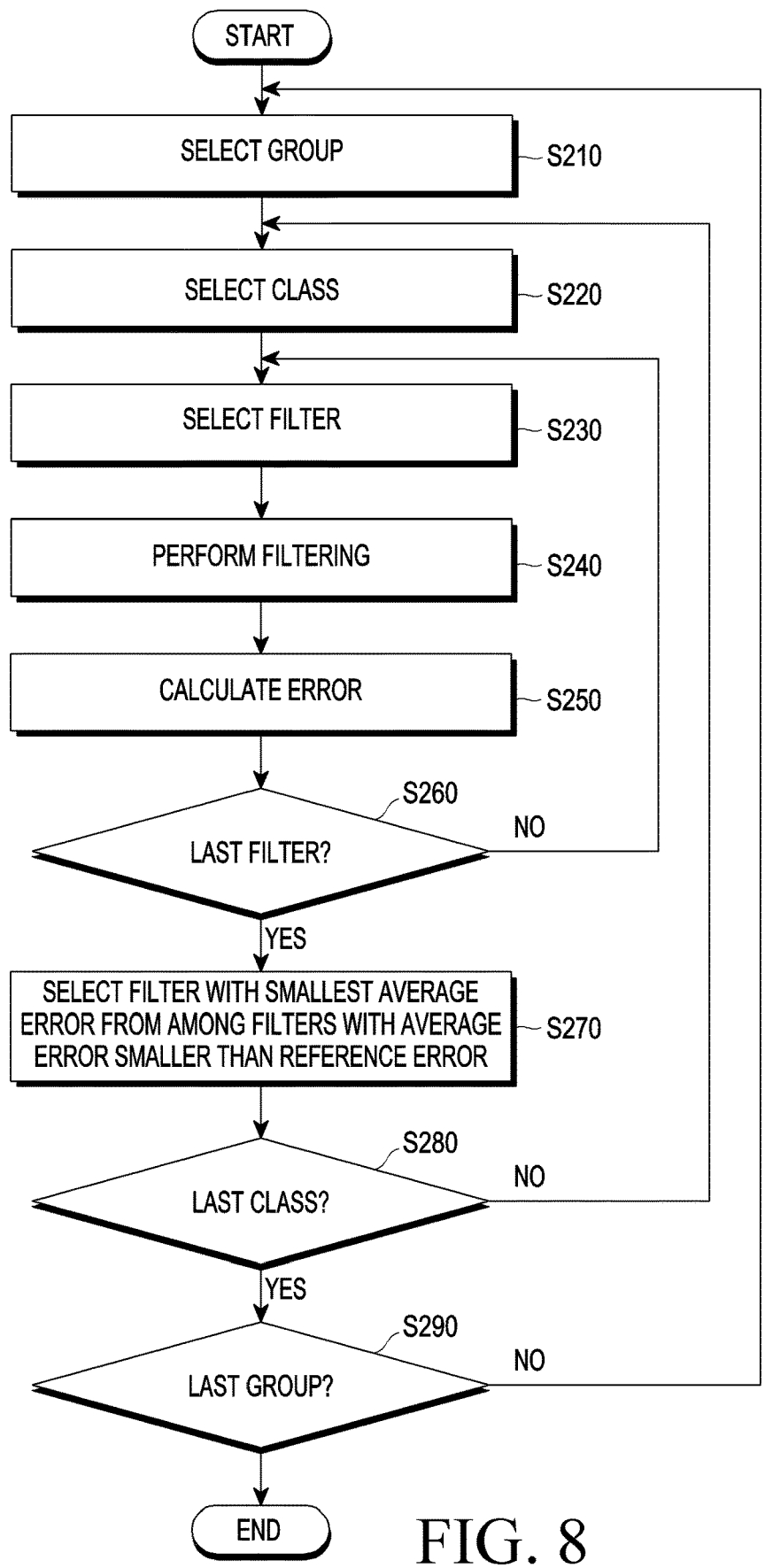
FIG. 8 illustrates an example of a process of selecting a filter for a class by repeatedly applying filters by a learning module.

FIG. 8 illustrates an example of a process of selecting a filter for a class by repeatedly applying filters by a learning module 300. Referring to FIGS. 5, 7, and 8, in step S210, the filter detector 320 of the learning module 300 may select a group. For example, the filter detector 320 may select one group from among first to third groups.

In step S220, the filter detector 320 may select a class. For example, the filter detector 320 may select one from among the classes belonging to the selected group. In step S230, the filter detector 320 may perform one filter among various filters of the filter pool. In step S240, the filter detector 320 may perform filtering by applying the selected filter to the degraded image data DID of the selected class of the selected group.

In step S250, the filter detector 320 may calculate an error. For example, the filter detector 320 may calculate the difference between image data ID associated with the degraded image data DID and the filtered image data, as an error. For example, the filter detector 320 may calculate the error based on structural similarity image metric (SSIM). The filter detector 320 may calculate an average error between a plurality of degraded image data belonging to the same class and a plurality of image data corresponding to the plurality of degraded image data.

In step S260, the filter detector 320 may determine whether the selected filter is the last filter of the filter pool. For example, the filter detector 320 may determine whether steps S230 to S250 have been performed on all of the filters in the filter pool. Unless steps S230 to S250 have been performed on all of the filters in the filter pool, the filter detector 320 may select a filter not selected in step S230 and perform steps S240 and S250.

If steps S230 to S250 have been performed on all of the filters in the filter pool, the filter detector 320 may perform step S270. In step S270, the filter detector 320 may select the filter with the smallest average error from among the filters with average errors smaller than a reference error, as the filter of the selected class of the selected group. For example, the reference error may be a target error when deblurring is performed using filters. The reference error may serve as a threshold at which the filter may be used instead of a deep learning-based deblurring module. The reference error may be determined based on a target performance, arbitrarily, or based on the performance (e.g., error) of the deep learning-based deblurring module. For example, the reference error may be determined as a real multiple of the error of the deep learning-based deblurring module.

In step S280, the filter detector 320 may determine whether the selected class is the last class of the selected group. For example, the filter detector 320 may determine whether steps S220 to S270 have been performed on all of the classes of the selected group. Unless steps S220 to S270 have been performed on all of the classes of the selected group, the filter detector 320 may select a class not yet selected, from among the classes of the selected group in step S220 and perform steps S230 and S270. If steps S220 to S270 have been performed on all of the classes of the selected group, the filter detector 320 may perform step S290.

In step S290, the filter detector 320 may determine whether the selected group is the last group. For example, the filter detector 320 may determine whether steps S220 to S280 have been performed on all the groups. Unless steps S220 to S280 have been performed on all of the groups, the filter detector 320 may select a group not yet selected in step S210 and perform steps S220 and S280. If steps S210 to S280 have been performed on all the groups, the learning module 300 may terminate the filter detection.

As described above, the learning module 300 may sequentially apply the filters of the filter pool to the degraded image data DID belonging to each class and select a filter with the smallest error (e.g., average error) smaller than the reference error, as the filter of the corresponding class. Accordingly, a deblurring filter may be adaptively selected according to the feature (e.g., first feature and second feature) of the degraded image data DID, and the effect of deblurring may be increased.

Figure 9:
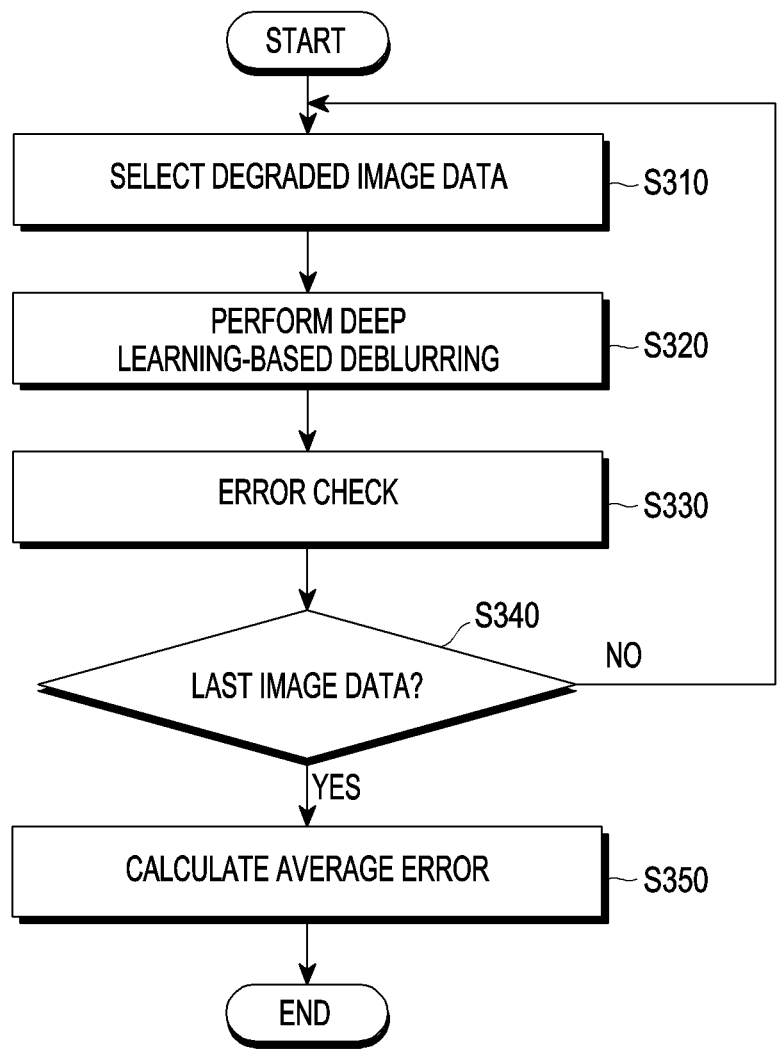
FIG. 9 illustrates an example of calculating a reference error by a deblurring module based on deep learning.

FIG. 9 illustrates an example of calculating a reference error by a deblurring module based on deep learning. Referring to FIGS. 4 and 9, the processor 210 may execute a deblurring module trained to perform deblurring based on deep learning. In step S310, the processor 210 may select degraded image data DID.

In step S320, the processor 210 may perform deep learning-based deblurring. In step S330, the processor 210 may perform an error check. For example, the processor 210 may calculate the difference between the deblurring image data corresponding to the degraded image data DID and the image data ID, as an error. The error check may be performed based on SSIM.

In step S340, the processor 210 may determine whether the selected image data is the last image data. For example, the processor 210 may determine whether step S310 to S330 have been performed on all degraded image data DID. Unless steps S310 to S330 have been performed on all degraded image data DID, the processor 210 may select image data not yet selected in step S310 and perform steps S320 and S330.

If steps S310 to S330 have been performed on all the degraded image data DID, the processor 210 may calculate the average error as the reference error in step S350. For example, the processor 210 may calculate the average error of the entire degraded image data DID as the reference error. The processor 210 may calculate the per-group average errors of the degraded image data DID as per-group reference errors. The processor 210 may calculate the per-class average errors of the degraded image data DID as per-class reference errors. The calculated reference error(s) may be used as a reference for selecting a filter in FIG. 8.

Figure 10:
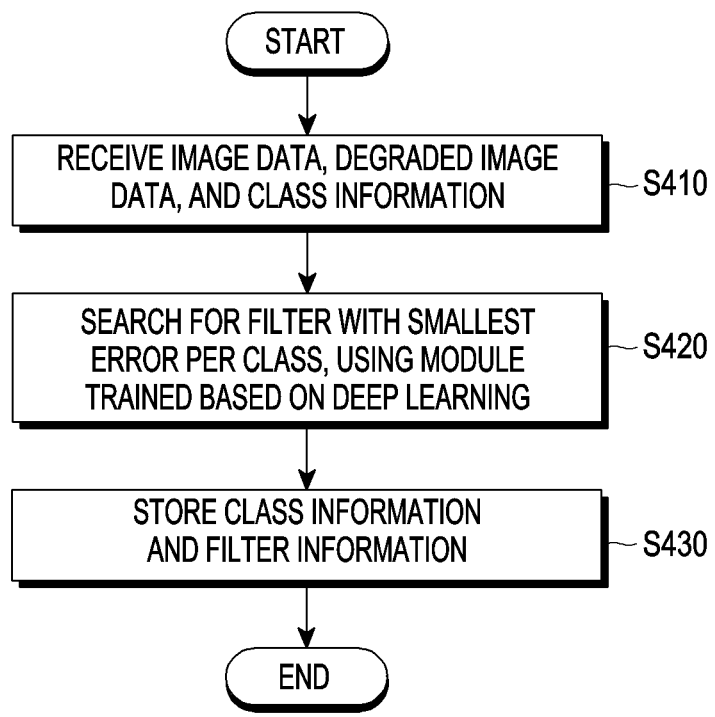
FIG. 10 illustrates an example of selecting filters based on deep learning by a filter detector.

FIG. 10 illustrates an example of selecting filters based on deep learning by a filter detector 320. Referring to FIGS. 5 and 10, in step S410, the filter detector 320 of the learning module 300 may receive image data ID, degraded image data DID, and class information CI.

In step S420, the filter detector 320 may search for the filter with the smallest error per class, using the module trained based on deep learning. For example, the filter detector 320 may search for the filter for calibrating the degraded image data DID to be closest to the image data ID, for each class. The filter detector 320 may search for the filter closest to the reference error for each class. In step S430, the filter detector 320 may store the class information CI and the filter information FI in the filter lookup table 330 in association with each other.

As described above, the filter detector 320 may select a filter per class using the module trained based on deep learning to search for a filter. For example, the filter information FI may include the type of the filter and the value of the filtering coefficient applied to the filter.

Figure 11:
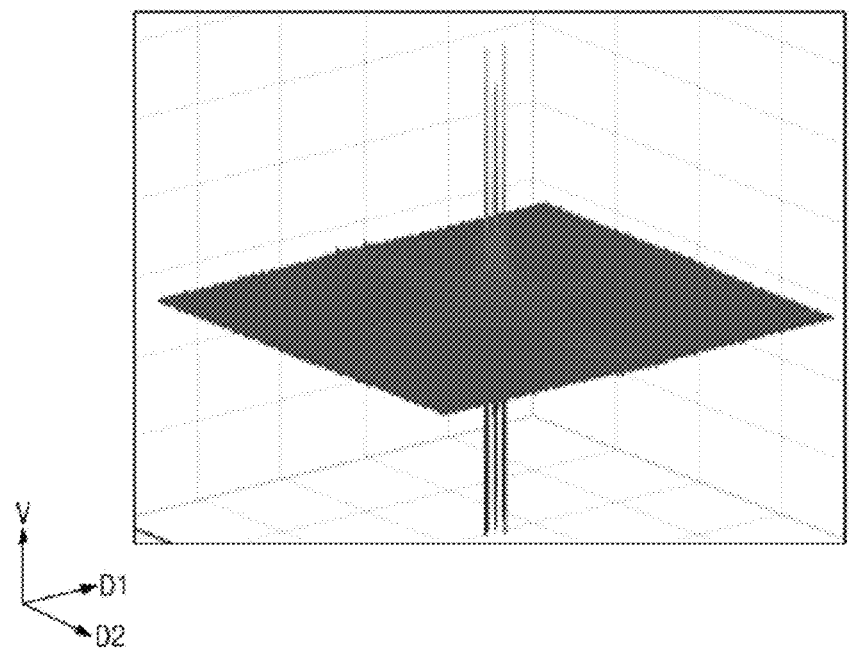
FIG. 11 illustrates an example of 3D filtering of a filter to restore the point spread function of FIG. 3E.

FIG. 11 illustrates an example of 3D filtering of a filter to restore the point spread function of FIG. 3E. As shown in FIG. 3E, the point spread function may protrude in the first direction D1 and the second direction D2 perpendicular to the first direction. To restore the point spread function, the kernel size of the filter may increase in the first direction D1 and the second direction D2 as shown in FIG. 11. For example, in FIG. 11, the kernels of the filter may have values V in the entire area corresponding to the image data. If the kernel size of the filter increases, the computation time of filtering may increase.

Figure 12:
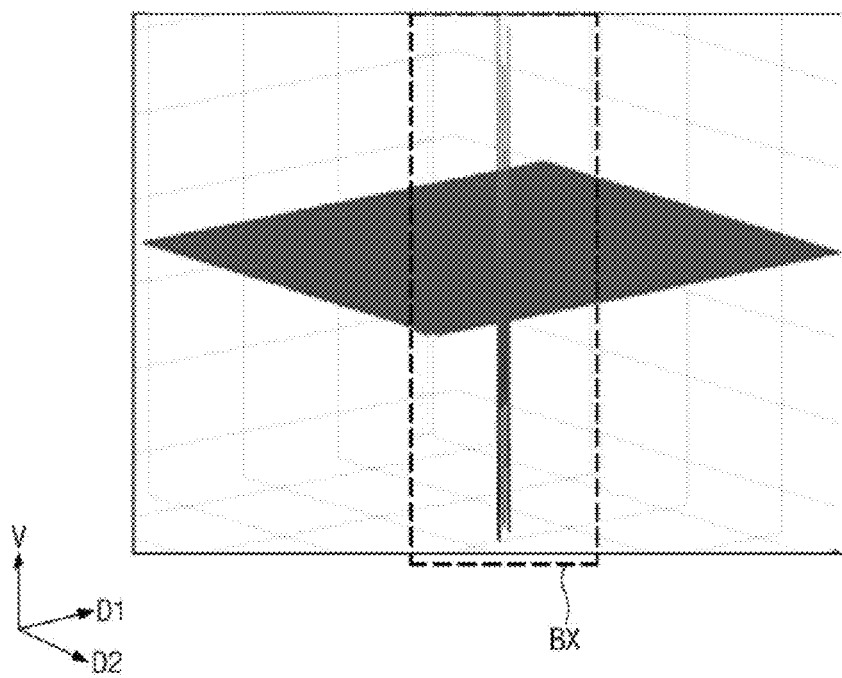
FIG. 12 illustrates an example of 3D modeling of a downsized filter.

FIG. 12 illustrates an example of 3D modeling of a downsized filter. The kernel of the filter of FIG. 11 has effective values in the entire area. In contrast, referring to FIG. 12, the values V of the kernel except for the portions marked with boxes BX may be '0.' Accordingly, the computation time of filtering may reduce, and real-time filtering may be enabled.

Figure 13:
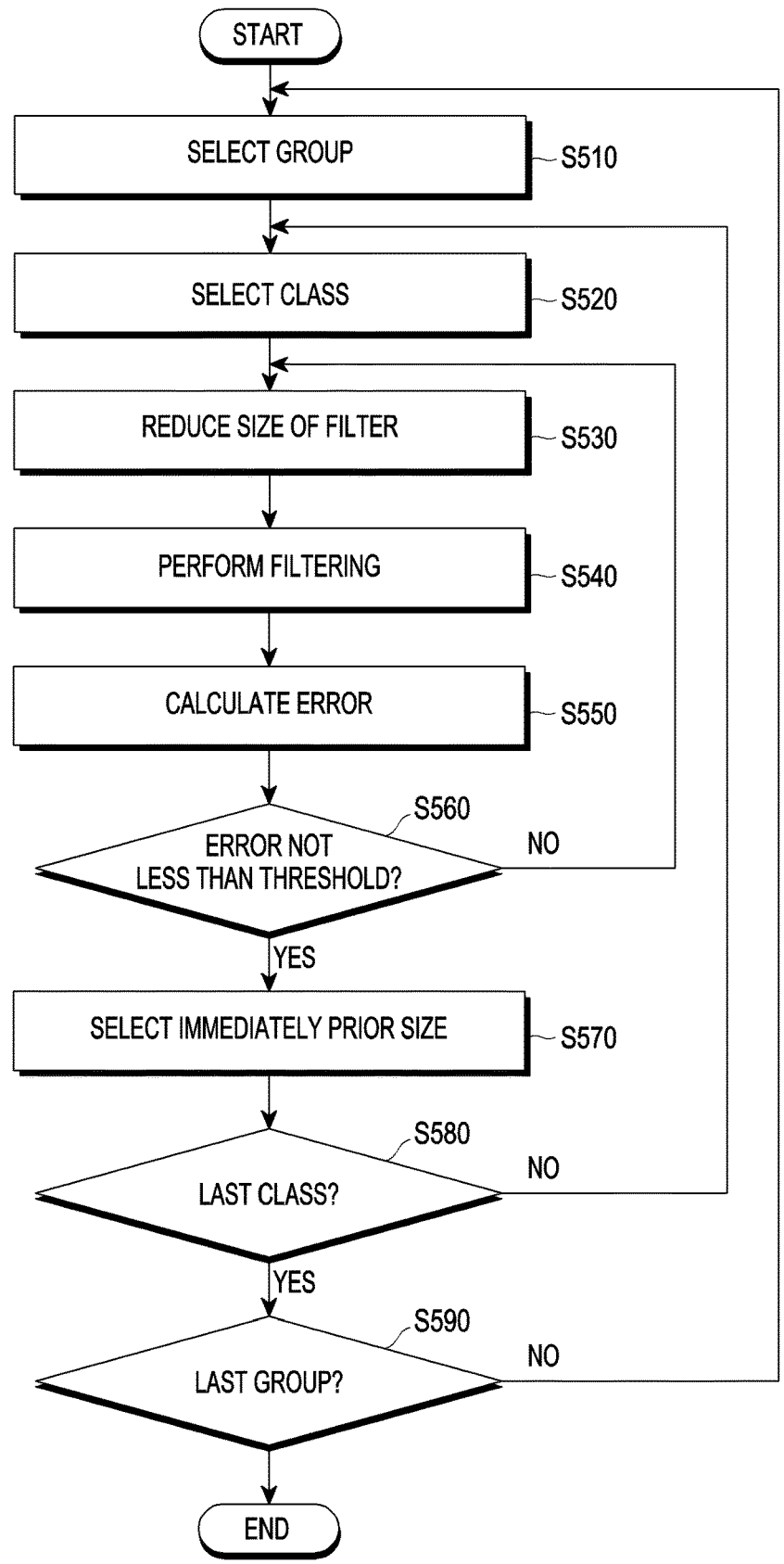
FIG. 13 illustrates an example of a process of reducing the size of a filter per class by a learning module.

FIG. 13 illustrates an example of a process of reducing the size of a filter per class by a learning module 300. Referring to FIGS. 5, 7, and 13, in step S510, the filter detector 320 of the learning module 300 may select a group. For example, the filter detector 320 may select one group from among first to third groups.

In step S520, the filter detector 320 may select a class. For example, the filter detector 320 may select one from among the classes belonging to the selected group. In step S530, the filter detector 320 may reduce the filter size of the selected class. For example, the filter detector 320 may change some of the values of the kernel of the filter of the selected class into '0.' For example, the filter detector 320 may change the values of the portions corresponding to the outermost positions of the effective values of the kernel into '0.' Or, the filter detector 320 may divide areas with concentric circles having different widths from the center of the kernel. The filter detector 320 may change the values of the kernel in the outermost area into '0.' In step S540, the filter detector 320 may perform filtering by applying the resized filter to the degraded image data DID of the selected class of the selected group.

In step S550, the filter detector 320 may calculate an error. For example, the filter detector 320 may calculate the difference between image data ID associated with the degraded image data DID and the filtered image data, as an error. For example, the filter detector 320 may calculate the error based on structural similarity image metric (SSIM).

In step S560, the filter detector 320 may determine whether the average error is a threshold or more, or the filter detector 320 may determine whether the difference between the average error and the reference error is a threshold or more. Unless the average error is larger than the reference error or unless the average error is larger than the reference error by a second threshold or more, the filter detector 320 may further reduce the size of the filter in step S530. For example, the filter detector may change the values of the outermost area, which has effective values in the kernel, into '0.' Thereafter, the filter detector S520 may again perform steps S550 and S560. In step S560, if the average error is the reference error or more or if the average error is larger than the second threshold by the reference error or more, the filter detector 320 may select the immediately prior size as the size of the filter in step S570. The second threshold may correspond to the quality of image data that may be sacrificed to speed up and simplify deblurring. The second threshold may be determined based on the specifications of the electronic device 100, e.g., the performance and physical characteristics of the camera module 130, the performance of the processor 110, the performance of the memory 120, or the performance of the display module 140.

In step S580, the filter detector 320 may determine whether the selected class is the last class of the selected group. For example, the filter detector 320 may determine whether steps S520 to S570 have been performed on all of the classes of the selected group. Unless steps S520 to S570 have been performed on all of the classes of the selected group, the filter detector 320 may select a class not yet selected, from among the classes of the selected group in step S520 and perform steps S530 and S570. If steps S520 to S570 have been performed on all of the classes of the selected group, the filter detector 320 may perform step S590.

In step S590, the filter detector 320 may determine whether the selected group is the last group. For example, the filter detector 320 may determine whether steps S520 to S580 have been performed on all the groups. Unless steps S510 to S580 have been performed on all of the groups, the filter detector 320 may select a group not yet selected in step S510 and perform steps S520 and S580. If steps S510 to S580 have been performed on all the groups, the learning module 300 may terminate the filter detection.

As described above, the learning module 300 may be regarded as stepwise reducing the kernel size of the filter in a range in which the increase in average error is smaller than the second threshold. Accordingly, a filter may be selected which has a reduced filtering computation time and has an error within an allowable range. The method for reducing the filter size as shown in FIG. 13 may be applicable both when a filter is selected through repeated filtering of FIG. 9 and when a filter is selected using a deep learning-based module of FIG. 10.

Figure 14:
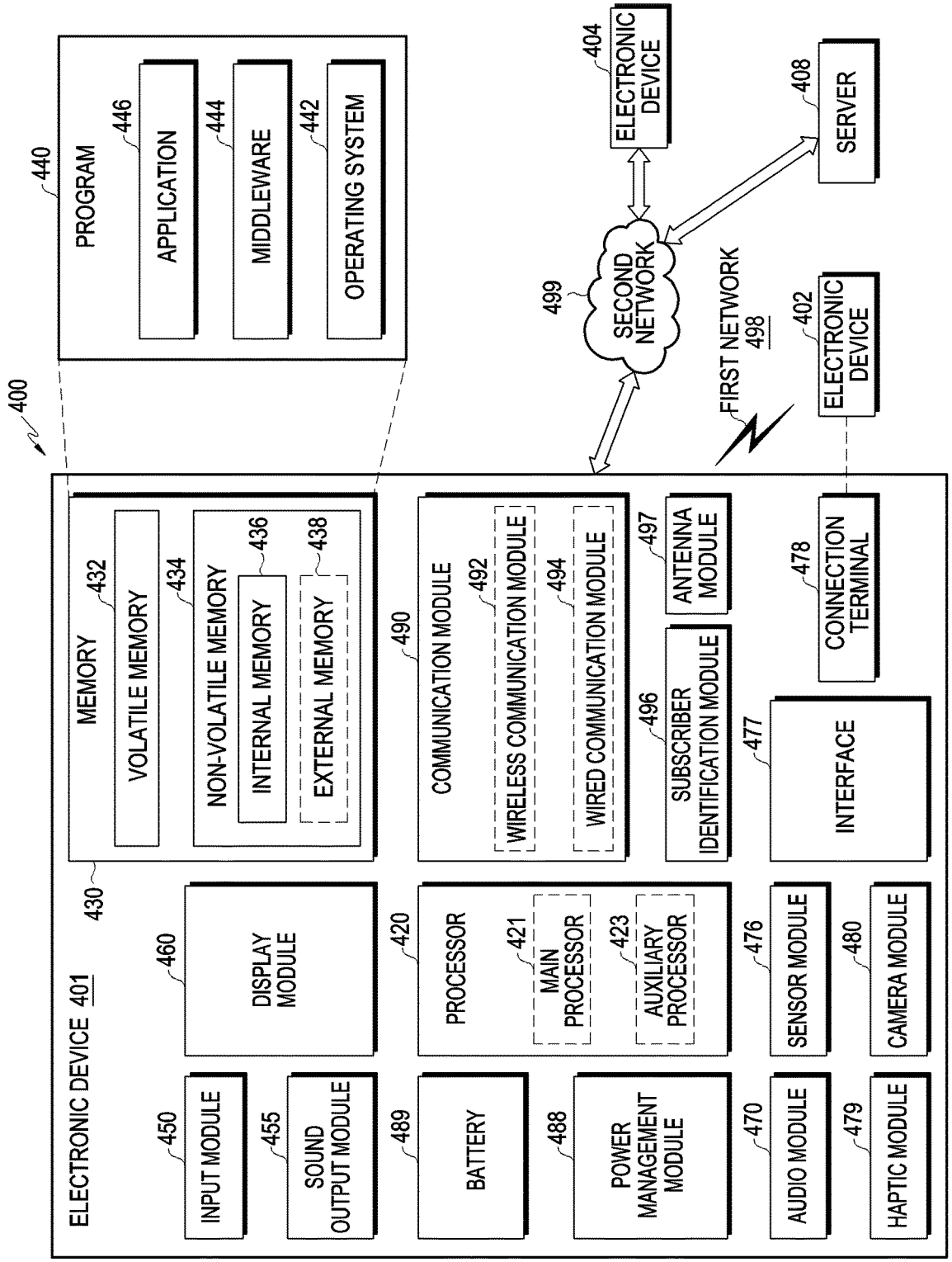
FIG. 14 is a block diagram illustrating an electronic device in a network environment according to various embodiments.

FIG. 14 is a block diagram illustrating an electronic device 401 in a network environment 400 according to various embodiments. For example, the electronic device 401 illustrates an expanded implementation example of the electronic device 100 of FIG. 1. For example, the electronic device 401 may receive the result of performing filter learning by the electronic device 200 of FIG. 4. The electronic device 401 may receive classes of image data and information about filters respectively corresponding to the classes from the electronic device 200 of FIG. 4. The electronic device 401 may perform deblurring based on the received information. For example, the electronic device 401 may generate image data using the camera module 480, identify the class of the image data, select a filter using the received information, and perform deblurring on the image data using the selected filter.

Referring to FIG. 14, the electronic device 401 in the network environment 400 may communicate with at least one of an electronic device 402 via a first network 498 (e.g., a short-range wireless communication network), or an electronic device 404 or a server 408 via a second network 499 (e.g., a long-range wireless communication network). According to an embodiment, the electronic device 401 may communicate with the electronic device 404 via the server 408. According to an embodiment, the electronic device 401 may include a processor 420, memory 430, an input module 450, a sound output module 455, a display module 460, an audio module 470, a sensor module 476, an interface 477, a connecting terminal 478, a haptic module 479, a camera module 480, a power management module 488, a battery 489, a communication module 490, a subscriber identification module (SIM) 496, or an antenna module 497. In some embodiments, at least one (e.g., the connecting terminal 478) of the components may be omitted from the electronic device 401, or one or more other components may be added in the electronic device 101. According to an embodiment, some (e.g., the sensor module 476, the camera module 480, or the antenna module 497) of the components may be integrated into a single component (e.g., the display module 460).

The processor 420 may execute, for example, software (e.g., a program 440) to control at least one other component (e.g., a hardware or software component) of the electronic device 401 coupled with the processor 420, and may perform various data processing or computation. According to one embodiment, as at least part of the data processing or computation, the processor 420 may store a command or data received from another component (e.g., the sensor module 476 or the communication module 490) in volatile memory 432, process the command or the data stored in the volatile memory 432, and store resulting data in non-volatile memory 434. According to an embodiment, the processor 420 may include a main processor 421 (e.g., a central processing unit (CPU) or an application processor (AP)), or an auxiliary processor 423 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 401 includes the main processor 421 and the auxiliary processor 423, the auxiliary processor 423 may be configured to use lower power than the main processor 421 or to be specified for a designated function. The auxiliary processor 423 may be implemented as separate from, or as part of the main processor 421.

The auxiliary processor 423 may control at least some of functions or states related to at least one component (e.g., the display module 460, the sensor module 476, or the communication module 490) among the components of the electronic device 401, instead of the main processor 421 while the main processor 421 is in an inactive (e.g., sleep) state, or together with the main processor 421 while the main processor 421 is in an active state (e.g., executing an application). According to an embodiment, the auxiliary processor 423 (e.g., an image signal processor or a communication processor) may be implemented as part of another component (e.g., the camera module 480 or the communication module 490) functionally related to the auxiliary processor 123. According to an embodiment, the auxiliary processor 423 (e.g., the neural processing unit) may include a hardware structure specified for artificial intelligence model processing. The artificial intelligence model may be generated via machine learning. Such learning may be performed, e.g., by the electronic device 401 where the artificial intelligence is performed or via a separate server (e.g., the server 408). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

For example, the processor 420 may correspond to the processor 110 of the electronic device 100 of FIG. 1. The main processor 421 and the auxiliary processor 423 may correspond to the main processor 111 and the auxiliary processor 113, respectively, of FIG. 1.

The memory 430 may store various data used by at least one component (e.g., the processor 420 or the sensor module 476) of the electronic device 401. The various data may include, for example, software (e.g., the program 440) and input data or output data for a command related thereto. The memory 430 may include the volatile memory 432 or the non-volatile memory 434.

For example, the memory 430 may correspond to the memory 120 of the electronic device 100 of FIG. 1. The volatile memory 432 and the non-volatile memory 434 may correspond to the volatile memory 122 and the non-volatile memory 124, respectively, of FIG. 1.

The program 440 may be stored in the memory 430 as software, and may include, for example, an operating system (OS) 442, middleware 444, or an application 446.

The input module 450 may receive a command or data to be used by other component (e.g., the processor 420) of the electronic device 401, from the outside (e.g., a user) of the electronic device 401. The input module 450 may include, for example, a microphone, a mouse, a keyboard, keys (e.g., buttons), or a digital pen (e.g., a stylus pen).

The sound output module 455 may output sound signals to the outside of the electronic device 401. The sound output module 455 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 460 may visually provide information to the outside (e.g., a user) of the electronic device 401. The display 460 may include, for example, a display, a hologram device, or a projector and control circuitry to control a corresponding one of the display, hologram device, and projector. According to an embodiment, the display 460 may include a touch sensor configured to detect a touch, or a pressure sensor configured to measure the intensity of a force generated by the touch. For example, the display module 460 may correspond to the display module 140 of the electronic device 100 of FIG. 1.

The audio module 470 may convert a sound into an electrical signal and vice versa. According to an embodiment, the audio module 470 may obtain the sound via the input module 450, or output the sound via the sound output module 455 or a headphone of an external electronic device (e.g., an electronic device 402) directly (e.g., wiredly) or wirelessly coupled with the electronic device 401.

The sensor module 476 may detect an operational state (e.g., power or temperature) of the electronic device 401 or an environmental state (e.g., a state of a user) external to the electronic device 101, and then generate an electrical signal or data value corresponding to the detected state. According to an embodiment, the sensor module 476 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 477 may support one or more specified protocols to be used for the electronic device 401 to be coupled with the external electronic device (e.g., the electronic device 402) directly (e.g., wiredly) or wirelessly. According to an embodiment, the interface 477 may include, for example, a high definition multimedia interface (HDMI), a universal serial bus (USB) interface, a secure digital (SD) card interface, or an audio interface.

A connecting terminal 478 may include a connector via which the electronic device 401 may be physically connected with the external electronic device (e.g., the electronic device 402). According to an embodiment, the connecting terminal 478 may include, for example, a HDMI connector, a USB connector, a SD card connector, or an audio connector (e.g., a headphone connector).

The haptic module 479 may convert an electrical signal into a mechanical stimulus (e.g., a vibration or motion) or electrical stimulus which may be recognized by a user via his tactile sensation or kinesthetic sensation. According to an embodiment, the haptic module 479 may include, for example, a motor, a piezoelectric element, or an electric stimulator.

The camera module 480 may capture a still image or moving images. According to an embodiment, the camera module 480 may include one or more lenses, image sensors, image signal processors, or flashes. For example, the camera module 480 may correspond to the camera module 130 of the electronic device 100 of FIG. 1.

The power management module 488 may manage power supplied to the electronic device 401. According to one embodiment, the power management module 488 may be implemented as at least part of, for example, a power management integrated circuit (PMIC).

The battery 489 may supply power to at least one component of the electronic device 401. According to an embodiment, the battery 489 may include, for example, a primary cell which is not rechargeable, a secondary cell which is rechargeable, or a fuel cell.

The communication module 490 may support establishing a direct (e.g., wired) communication channel or a wireless communication channel between the electronic device 401 and the external electronic device (e.g., the electronic device 402, the electronic device 404, or the server 408) and performing communication via the established communication channel. The communication module 490 may include one or more communication processors that are operable independently from the processor 420 (e.g., the application processor (AP)) and supports a direct (e.g., wired) communication or a wireless communication. According to an embodiment, the communication module 490 may include a wireless communication module 492 (e.g., a cellular communication module, a short-range wireless communication module, or a global navigation satellite system (GNSS) communication module) or a wired communication module 494 (e.g., a local area network (LAN) communication module or a power line communication (PLC) module). A corresponding one of these communication modules may communicate with the external electronic device 404 via a first network 498 (e.g., a short-range communication network, such as Bluetooth™, wireless-fidelity (Wi-Fi) direct, or infrared data association (IrDA)) or a second network 499 (e.g., a long-range communication network, such as a legacy cellular network, a 5G network, a next-generation communication network, the Internet, or a computer network (e.g., local area network (LAN) or wide area network (WAN)). These various types of communication modules may be implemented as a single component (e.g., a single chip), or may be implemented as multi components (e.g., multi chips) separate from each other. The wireless communication module 492 may identify or authenticate the electronic device 401 in a communication network, such as the first network 498 or the second network 499, using subscriber information (e.g., international mobile subscriber identity (IMSI)) stored in the subscriber identification module 496.

The wireless communication module 492 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 492 may support a high-frequency band (e.g., the mmWave band) to achieve, e.g., a high data transmission rate. The wireless communication module 492 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 492 may support various requirements specified in the electronic device 401, an external electronic device (e.g., the electronic device 404), or a network system (e.g., the second network 499). According to an embodiment, the wireless communication module 492 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 497 may transmit or receive a signal or power to or from the outside (e.g., the external electronic device). According to an embodiment, the antenna module 497 may include one antenna including a radiator formed of a conductor or conductive pattern formed on a substrate (e.g., a printed circuit board (PCB)). According to an embodiment, the antenna module 497 may include a plurality of antennas (e.g., an antenna array). In this case, at least one antenna appropriate for a communication scheme used in a communication network, such as the first network 498 or the second network 499, may be selected from the plurality of antennas by, e.g., the communication module 490. The signal or the power may then be transmitted or received between the communication module 490 and the external electronic device via the selected at least one antenna. According to an embodiment, other parts (e.g., radio frequency integrated circuit (RFIC)) than the radiator may be further formed as part of the antenna module 497.

According to various embodiments, the antenna module 497 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 401 and the external electronic device 404 via the server 408 coupled with the second network 499. The external electronic devices 402 each may be a device of the same or a different type from the electronic device 401. According to an embodiment, all or some of operations to be executed at the electronic device 401 may be executed at one or more of the external electronic devices 402. For example, if the electronic device 401 should perform a function or a service automatically, or in response to a request from a user or another device, the electronic device 401, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 401. The electronic device 401 may provide the outcome, with or without further processing of the outcome, as at least part of a reply to the request. To that end, a cloud computing, distributed computing, mobile edge computing (MEC), or client-server computing technology may be used, for example. The electronic device 401 may provide ultra low-latency services using, e.g., distributed computing or mobile edge computing. In another embodiment, the external electronic device 404 may include an Internet-of-things (IoT) device. The server 408 may be an intelligent server using machine learning and/or a neural network. According to an embodiment, the external electronic device 404 or the server 408 may be included in the second network 499. The electronic device 401 may be applied to intelligent services (e.g., smart home, smart city, smart car, or health-care) based on 5G communication technology or IoT-related technology.

Figure 15:
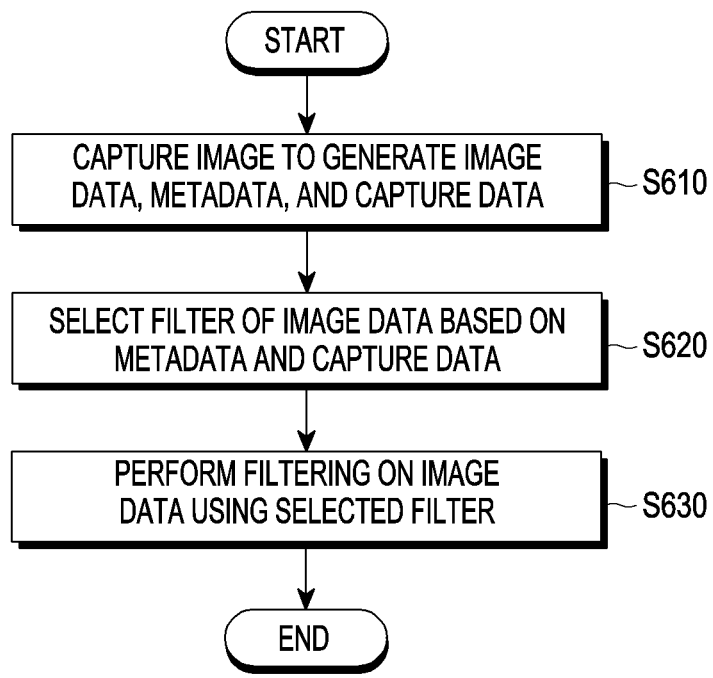
FIG. 15 illustrates an example of a process of performing deblurring using a filter by the electronic device of FIG. 14.

FIG. 15 illustrates an example of a process of performing deblurring using a filter by the electronic device 401 of FIG. 14. Referring to FIGS. 14 and 15, in step S610, the camera module 480 may capture an image, generating image data, metadata, and capture data.

For example, when the camera module 480 is implemented as a non-UDC as described in connection with FIGS. 2A, 2B, 2C, and 2D, the image data may be influenced by the point spread function described in connection with FIG. 2E. When the camera module 480 is implemented as a UDC as described in connection with FIGS. 3A, 3B, 3C, and 3D, the image data may be influenced by the point spread function described in connection with FIG. 3E. The image data, metadata, or capture data may be stored in the memory 430 through the processor 420.

In step S620, the processor 420 may read image data, metadata, or capture data from the memory 403. The processor 420 may select the filter of the image data based on the metadata and the capture data. For example, the processor 420 may select different filters depending on the types of content of image data.

In step S630, the processor 420 may perform filtering on the image data using the selected filter. The selected filter may remove (or suppress) the point spread function from the image data. The filtered image data may be stored in the memory 430. Thereafter, the display module 460 may receive the filtered image data from the memory 430 and display the filtered image data.

Figure 16:
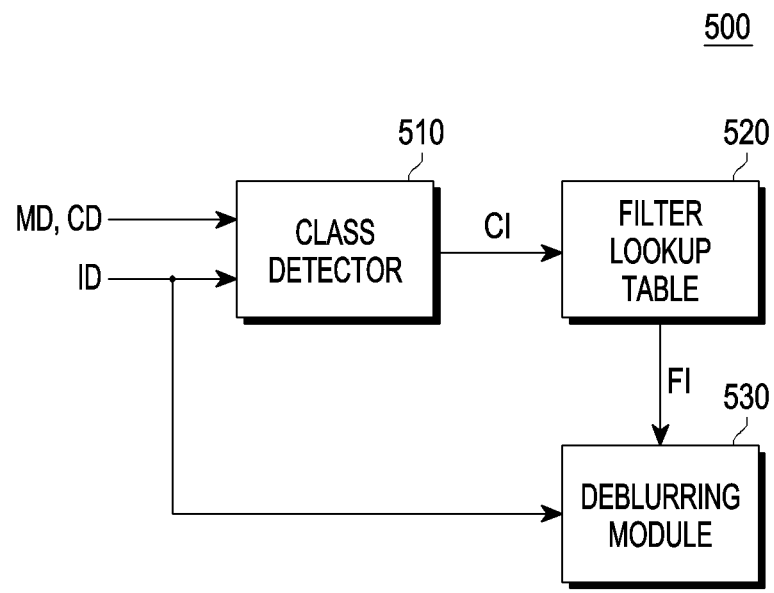
FIG. 16 illustrates an example of a filter-based deblurring module executed by a processor.

FIG. 16 illustrates an example of a filter-based deblurring module 500 executed by the processor 420 of FIG. 14. Referring to FIGS. 14 and 16, the filter-based deblurring module 500 may include a class detector 510, a filter lookup table 520, and a deblurring module 530.

The class detector 510 may receive the image data ID, metadata MD, and capture data CD. The class detector 510 may identify the class of the image data ID based on the image data ID, metadata MD, or capture data CD. The class detector 510 may output information about the identified class as class information CI.

For example, the class detector 510 may be operated and configured in the same manner as the class detector 310 of FIG. 5. The class detector 510 may identify the class of the image data ID in real-time. The class detector 510 may identify the class using the module trained based on deep learning or based on the values of the information about the metadata MD or capture data CD.

For example, the class detector 510 may fail to identify part of the image data ID. If classification fails, the class detector 510 may output information indicating that classification fails or there is no class, as class information CI.

The filter lookup table 520 may correspond to the filter lookup table 330 of FIG. 5. The filter lookup table 520 may store the filter information FI and class information CI, generated based on the result of learning by the learning module 300 in association with each other. If class information CI is transferred from the class detector 510, the filter lookup table 520 may output the filter information FI corresponding to the class information CI. The filter information FI may include the type of the filter and the value(s) of the filtering coefficient(s).

For example, when the class information CI indicates that classification fails or there is no class, the filter lookup table 520 may output information about a default filter, as the filter information FI. For example, the default filter may be one of the filters corresponding to the classes. As another example, the default filter may be a filter different in type, or having a different filtering coefficient, from the filters corresponding to the classes.

The deblurring module 530 may implement a filter based on the filter information FI. For example, the deblurring module 530 may include different filter modules. The deblurring module 530 may select one from among the filter modules based on the filter information FI and set filtering coefficients. The deblurring module 530 may filter the image data ID based on the configured filter.

As described above, the electronic device 401 may identify the class from the image data ID in real-time and implement the filter according to the class in real-time. It is possible to remove point spread function-incurred blurring in real-time by performing filtering using a real-time implemented filter.

Figure 17:
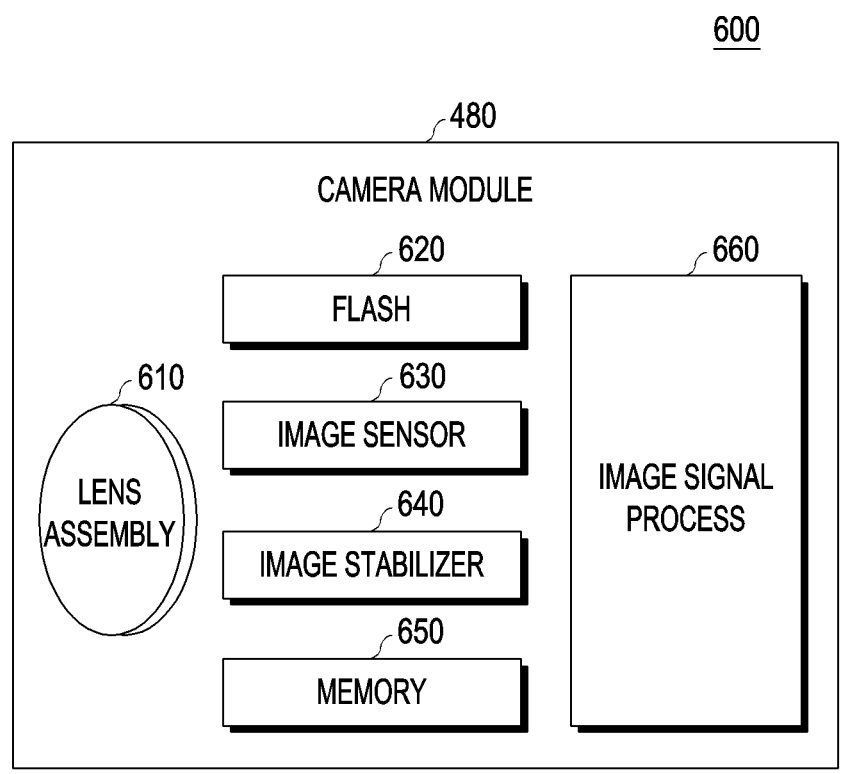
FIG. 17 is a block diagram illustrating an example of a camera module according to various embodiments.

FIG. 17 is a block diagram 600 illustrating the camera module 480 of FIG. 14 according to various embodiments. Referring to FIG. 17, the camera module 480 may include a lens assembly 610, a flash 620, an image sensor 630, an image stabilizer 640, memory 650 (e.g., buffer memory), or an image signal processor 660. The lens assembly 610 may collect light emitted or reflected from an object whose image is to be taken. The lens assembly 610 may include one or more lenses. According to an embodiment, the camera module 480 may include a plurality of lens assemblies 610. In such a case, the camera module 480 may form, for example, a dual camera, a 360-degree camera, or a spherical camera. Some of the plurality of lens assemblies 610 may have the same lens attribute (e.g., view angle, focal length, auto-focusing, f number, or optical zoom), or at least one lens assembly may have one or more lens attributes different from those of another lens assembly. The lens assembly 610 may include, for example, a wide-angle lens or a telephoto lens.

The flash 620 may emit light that is used to reinforce light reflected from an object. According to an embodiment, the flash 620 may include one or more light emitting diodes (LEDs) (e.g., a red-green-blue (RGB) LED, a white LED, an infrared (IR) LED, or an ultraviolet (UV) LED) or a xenon lamp. The image sensor 630 may obtain an image corresponding to an object by converting light emitted or reflected from the object and transmitted via the lens assembly 610 into an electrical signal. According to an embodiment, the image sensor 630 may include one selected from image sensors having different attributes, such as a RGB sensor, a black-and-white (BW) sensor, an IR sensor, or a UV sensor, a plurality of image sensors having the same attribute, or a plurality of image sensors having different attributes. Each image sensor included in the image sensor 630 may be implemented using, for example, a charged coupled device (CCD) sensor or a complementary metal oxide semiconductor (CMOS) sensor.

The image stabilizer 640 may move the image sensor 630 or at least one lens included in the lens assembly 610 in a particular direction, or control an operational attribute (e.g., adjust the read-out timing) of the image sensor 630 in response to the movement of the camera module 480 or the electronic device 401 including the camera module 180. This allows compensating for at least part of a negative effect (e.g., image blurring) by the movement on an image being captured. According to an embodiment, the image stabilizer 640 may sense such a movement by the camera module 480 or the electronic device 401 using a gyro sensor (not shown) or an acceleration sensor (not shown) disposed inside or outside the camera module 480. According to an embodiment, the image stabilizer 640 may be implemented, for example, as an optical image stabilizer.

The memory 650 may store, at least temporarily, at least part of an image obtained via the image sensor 630 for a subsequent image processing task. For example, if image capturing is delayed due to shutter lag or multiple images are quickly captured, a raw image obtained (e.g., a Bayer-patterned image, a high-resolution image) may be stored in the memory 650, and its corresponding copy image (e.g., a low-resolution image) may be previewed via the display module 460. Thereafter, if a specified condition is met (e.g., by a user's input or system command), at least part of the raw image stored in the memory 650 may be obtained and processed, for example, by the image signal processor 660. According to an embodiment, the memory 650 may be configured as at least part of the memory 430 or as a separate memory that is operated independently from the memory 130.

The image signal processor 660 may perform one or more image processing with respect to an image obtained via the image sensor 630 or an image stored in the memory 650. The one or more image processing may include, for example, depth map generation, three-dimensional (3D) modeling, panorama generation, feature point extraction, image synthesizing, or image compensation (e.g., noise reduction, resolution adjustment, brightness adjustment, blurring, sharpening, or softening). Additionally or alternatively, the image signal processor 660 may perform control (e.g., exposure time control or read-out timing control) with respect to at least one (e.g., the image sensor 630) of the components included in the camera module 480. An image processed by the image signal processor 660 may be stored back in the memory 650 for further processing, or may be provided to an external component (e.g., the memory 430, the display module 460, the electronic device 402, the electronic device 404, or the server 408) outside the camera module 480. According to an embodiment, the image signal processor 660 may be configured as at least part of the processor 420, or as a separate processor that is operated independently from the processor 420. If the image signal processor 660 is configured as a separate processor from the processor 420, at least one image processed by the image signal processor 660 may be displayed, by the processor 420, via the display module 460 as it is or after being further processed.

According to an embodiment, the electronic device 401 may include a plurality of camera modules 480 having different attributes or functions. In such a case, at least one of the plurality of camera modules 480 may form, for example, a wide-angle camera and at least another of the plurality of camera modules 180 may form a telephoto camera. Similarly, at least one of the plurality of camera modules 480 may be a front camera (refer to 131 of FIGS. 2A, 2B, 2C, 3A, 3B, and 3C), and at least one other one may be a rear camera (refer to 132 of FIGS. 2A, 2B, 2C, 3A, 3B, and 3C).

The electronic device according to various embodiments may be one of various types of devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in the form of an integrated circuit (IC), an application-specific integrated circuit (ASIC), a field programmable gate array (FPGA), or a complex programmable logic device (CPLD).

Various embodiments as set forth herein may be implemented as software (e.g., the program 440) including one or more instructions that are stored in a storage medium (e.g., internal memory 436 or external memory 438) that is readable by a machine (e.g., the electronic device 401). For example, a processor (e.g., the processor 420) of the machine (e.g., the electronic device 401) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smartphones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. Some of the plurality of entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What has been described above is specific embodiments for carrying out the disclosure. The disclosure includes not only the above-described embodiments but also embodiments to which simple or easy changes may be made. The disclosure also includes techniques that may be easily modified and practiced using embodiments. Therefore, the scope of the disclosure should not be limited to the above-described embodiments, but should be defined by the following claims and equivalents thereto.

What is claimed is:

1. An electronic device comprising:
   a camera;
   at least one processor;
   a display, and
   memory storing instructions,
   wherein the instructions, when executed by the at least one processor, cause the electronic device to:
   obtain a first image data of a captured image via the camera, wherein the first image data includes capture data of the captured image via the camera and metadata of the captured image,
   identify a group to which the captured image belongs based on a first feature of the captured image, wherein the first feature of the captured image includes scene classification information on the captured image, and wherein the scene classification information is included in the capture data of the captured image,
   identify a class among a plurality of classes, included in the identified group, to which the captured image belongs based on a second feature of the captured image different from the first feature of the captured image, wherein the second feature of the captured image includes at least one of information about whether a face is recognized from the first image data, brightness information about the first image data, noise information about the first image data, and information about whether the first image data includes one of haze, mist, and fog,
   identify a filter, corresponding to the identified class, among a plurality of filters by using deep learning model, wherein the plurality of filters corresponds to plurality of classes, respectively,
   apply the identified filter to the captured image, and generate a restored image by applying the identified filter to the captured image.

2. The electronic device of claim 1, wherein the filter is configured to compensate for a point spread function (PSF) of the camera.

3. The electronic device of claim 1, wherein based on a determination that the class of the first image data is varied, the at least one processor is configured to vary the identified filter.

4. The electronic device of claim 1,
   wherein the capture data further includes at least one of size information about the captured image, edge direction information about the captured image, auto white balance (AWE) information when the captured image is captured, auto-focus (AF) information when the captured image is captured, and auto exposure (AE) information when the captured image is captured.

5. The electronic device of claim 1,
   wherein the camera includes a first area and a second area, and
   wherein the camera is configured to generate the first image data through the second area.

6. The electronic device of claim 5, wherein the camera has a point spread function (PSF) having a shape of protruding in a first direction and a second direction perpendicular to the first direction.

7. The electronic device of claim 1, wherein the plurality of filters includes at least one of a deconvolution filter, a weiner filter, and a city light suppression (CLS) filter.

8. The electronic device of claim 1, wherein the processor is configured to select a default filter based on a failure to identify the class of the captured image.

9. A method, comprising:
   obtaining a first image data of a captured image via a camera, wherein the first image data includes capture data of the captured image via the camera and metadata of the captured image,
   identifying a group to which the captured image belongs based on a first feature of the captured image, wherein the first feature of the captured image includes scene classification information on the captured image, and wherein the scene classification information is included in the capture data of the captured image,
   identifying a class among a plurality of classes, included in the identified group, to which the captured image belongs based on a second feature of the captured image different from the first feature of the captured image, wherein the second feature of the captured image includes at least one of information about whether a face is recognized from the first image data, brightness information about the first image data, noise information about the first image data, and information about whether the first image data includes one of haze, mist, and fog,
   identifying a filter, corresponding to the identified class, among a plurality of filters by using deep learning model, wherein the plurality of filters corresponds to plurality of classes, respectively,
   applying the identified filter to the captured image, and generating a restored image by applying the identified filter to the captured image.

10. The method of claim 9, wherein the filter is configured to compensate for a point spread function (PSP) of the camera.

11. The method of claim 9, wherein based on a determination that the class of the first image data is varied, varying the identified filter.

12. The method of claim 9, wherein the capture data further includes at least one of size information about the captured image, edge direction information about the captured image, auto white balance (AWE) information when the captured image is captured, auto-focus (AF) information when the captured image is captured, and auto exposure (AE) information when the captured image is captured.

13. The method of claim 9,
    wherein the camera includes a first area and a second area, and
    wherein the camera is configured to generate the first image data through the second area.

14. The method of claim 13, wherein the camera has a point spread function (PSP) having a shape of protruding in a first direction and a second direction perpendicular to the first direction.

15. The method of claim 9, wherein the plurality of filters includes at least one of a deconvolution filter, a weiner filter, and a city light suppression (CLS) filter.

16. A non-transitory storage medium storing one or more program, the one or more program comprising executable instructions configured to, when executed by at least one processor an electronic device, cause the electronic device to;

obtain a first image data of a captured image via a camera, wherein the first image data includes capture data of the captured image via the camera and metadata of the captured image, identify a group to which the captured image belongs based on a first feature of the captured image, wherein the first feature of the captured image includes scene classification information on the captured image, and wherein the scene classification information is included in the capture data of the captured image, identify a class among a plurality of classes, included in the identified group, to which the captured image belongs based on a second feature of the captured image different from the first feature of the captured image, wherein the second feature of the captured image includes at least one of information about whether a face is recognized from the first image data, brightness information about the first image data, noise information about the first image data, and information about whether the first image data includes one of haze, mist, and fog, identify a filter, corresponding to the identified class, among a plurality of filters by using deep learning model, wherein the plurality of filters corresponds to plurality of classes, respectively, apply the identified filter to the captured image, and generate a restored image by applying the identified filter to the captured image, obtaining original image data and first degraded image data;

identifying classes for the first degraded image data;

determining filters respectively corresponding to the classes to restore the first degraded image data to the original image data;

receiving second degraded image data;

identifying the classes for the second degraded image data; and generating restored image data by applying the filters respectively corresponding to the classes to the second degraded image data.

\* \* \* \* \*